(12) United States Patent
Baldi et al.

(10) Patent No.: US 9,210,090 B1
(45) Date of Patent: Dec. 8, 2015

(54) EFFICIENT STORAGE AND FLEXIBLE RETRIEVAL OF FULL PACKETS CAPTURED FROM NETWORK TRAFFIC

(71) Applicant: Narus, Inc., Sunnyvale, CA (US)

(72) Inventors: Mario Baldi, Cuneo (IT); Syed M. Hussain, Pleasanton, CA (US); Yong Liao, Sunnyvale, CA (US); Alok Tongaonkar, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 138 days.

(21) Appl. No.: 14/161,517

(22) Filed: Jan. 22, 2014

(51) Int. Cl.
*H04L 12/26* (2006.01)
*H04L 12/833* (2013.01)

(52) U.S. Cl.
CPC ..................................... *H04L 47/31* (2013.01)

(58) Field of Classification Search
None
See application file for complete search history.

(56) References Cited

U.S. PATENT DOCUMENTS

| | | | | |
|---|---|---|---|---|
| 6,421,342 | B1* | 7/2002 | Schwartz et al. | 370/392 |
| 8,949,444 | B1* | 2/2015 | Ma et al. | 709/228 |
| 2011/0087571 | A1* | 4/2011 | Sagi et al. | 705/34 |
| 2012/0323925 | A1* | 12/2012 | Fitzsimmons et al. | 707/741 |
| 2014/0006398 | A1* | 1/2014 | Johnson | 707/736 |

OTHER PUBLICATIONS

F. Fusco, X. Dimitropoulos, M. Vlachos, and L. Deri. pcapindex: An Index for Network Packet Traces with Legacy Compatibility. SIGCOMM Comput. Commun. Rev., 42(1):47-53, Jan. 2012.
S. McCanne and V. Jacobson. The BSD Packet Filter: A New Architecture for User-level Packet Capture. In Proceedings of the USENIX Winter 1993 Conference, USENIX'93, pp. 2-2, Berkeley, CA, USA, 1993. USENIX Association.
S. Kornexl, et al., Building a Time Machine for Efficient Recording and Retrieval of High-Volume Network Traffic. USENIX Association, Internet Measurement Conference 2005, pp. 267-272.

* cited by examiner

*Primary Examiner* — Kwang B Yao
*Assistant Examiner* — Juvena Loo
(74) *Attorney, Agent, or Firm* — Kwan & Olynick LLP

(57) ABSTRACT

A method for accessing (e.g., processing, storing, retrieving, etc.) network traffic data of a network. The method includes using separate data analysis device and data access device for capturing and analyzing network traffic data blocks concurrently and cooperatively to store and retrieve large amount of high speed network traffic data. In particular, the data analysis device and the data access device are synchronized using a linked set containing unique data block identifier and associated packet identifiers. The synchronization allows the data analysis device to focus on the full packet analysis task and the data access device to focus on the full packet storing and retrieving task without analyzing full packet content.

20 Claims, 16 Drawing Sheets

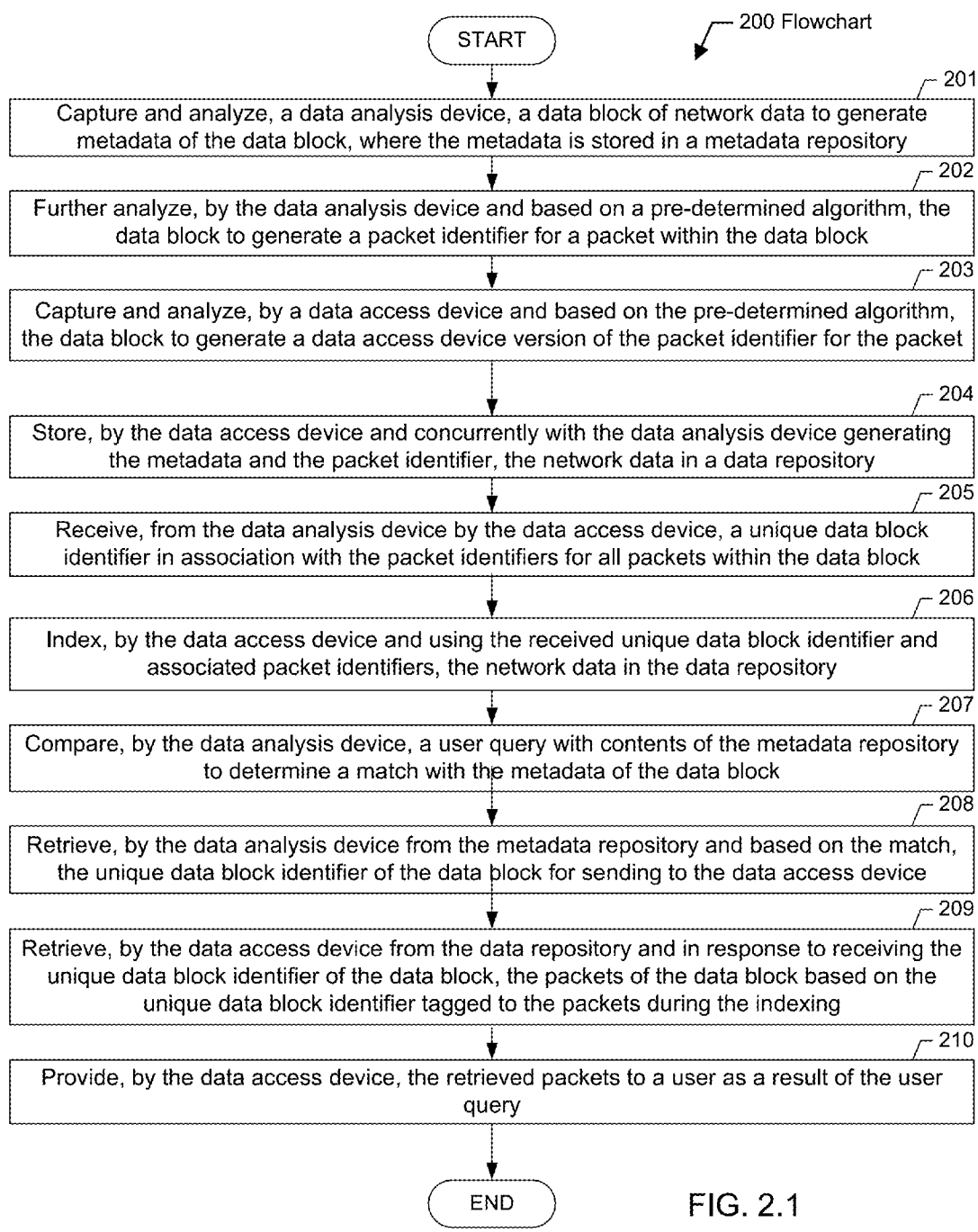
FIG. 2.1

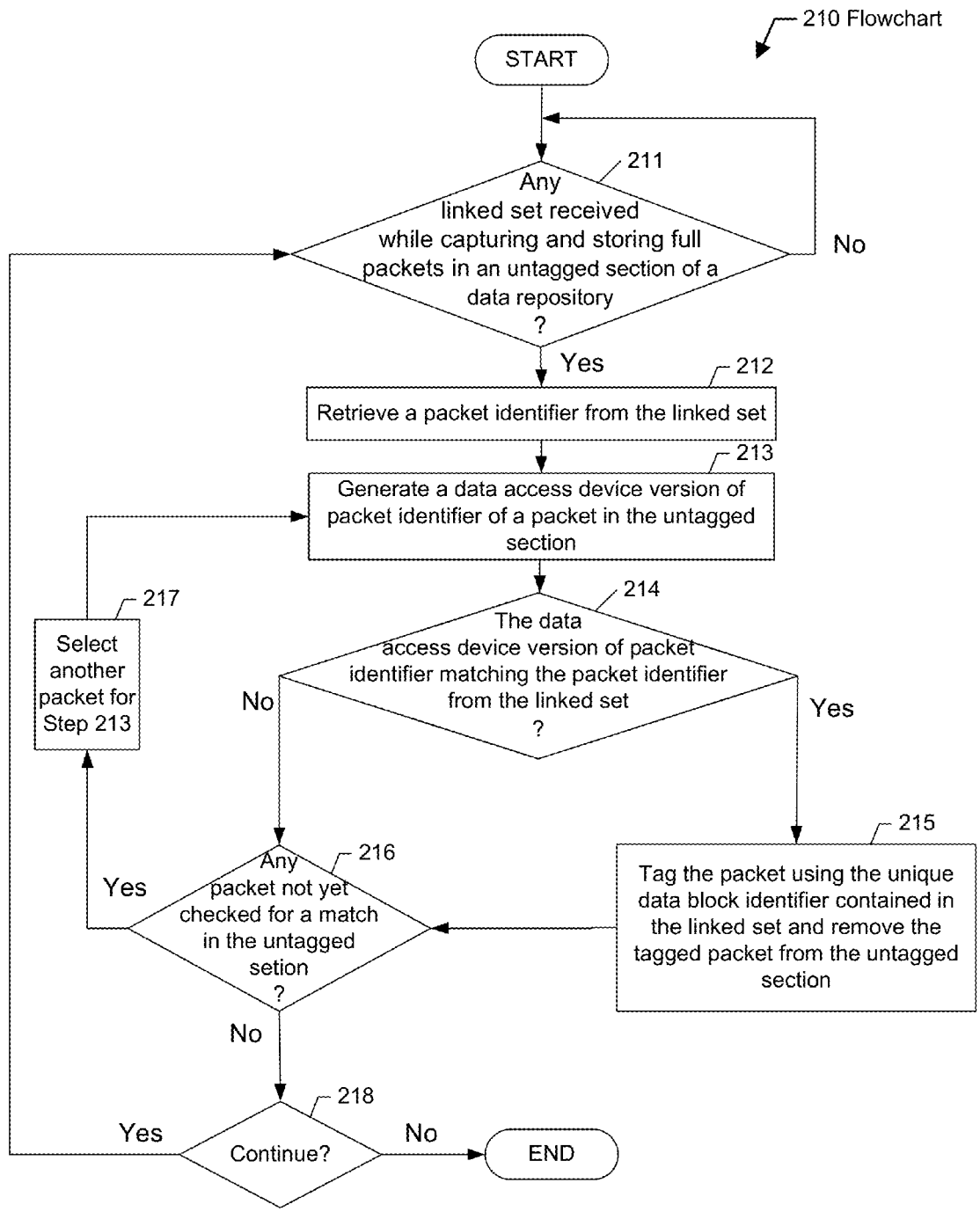
FIG. 2.2

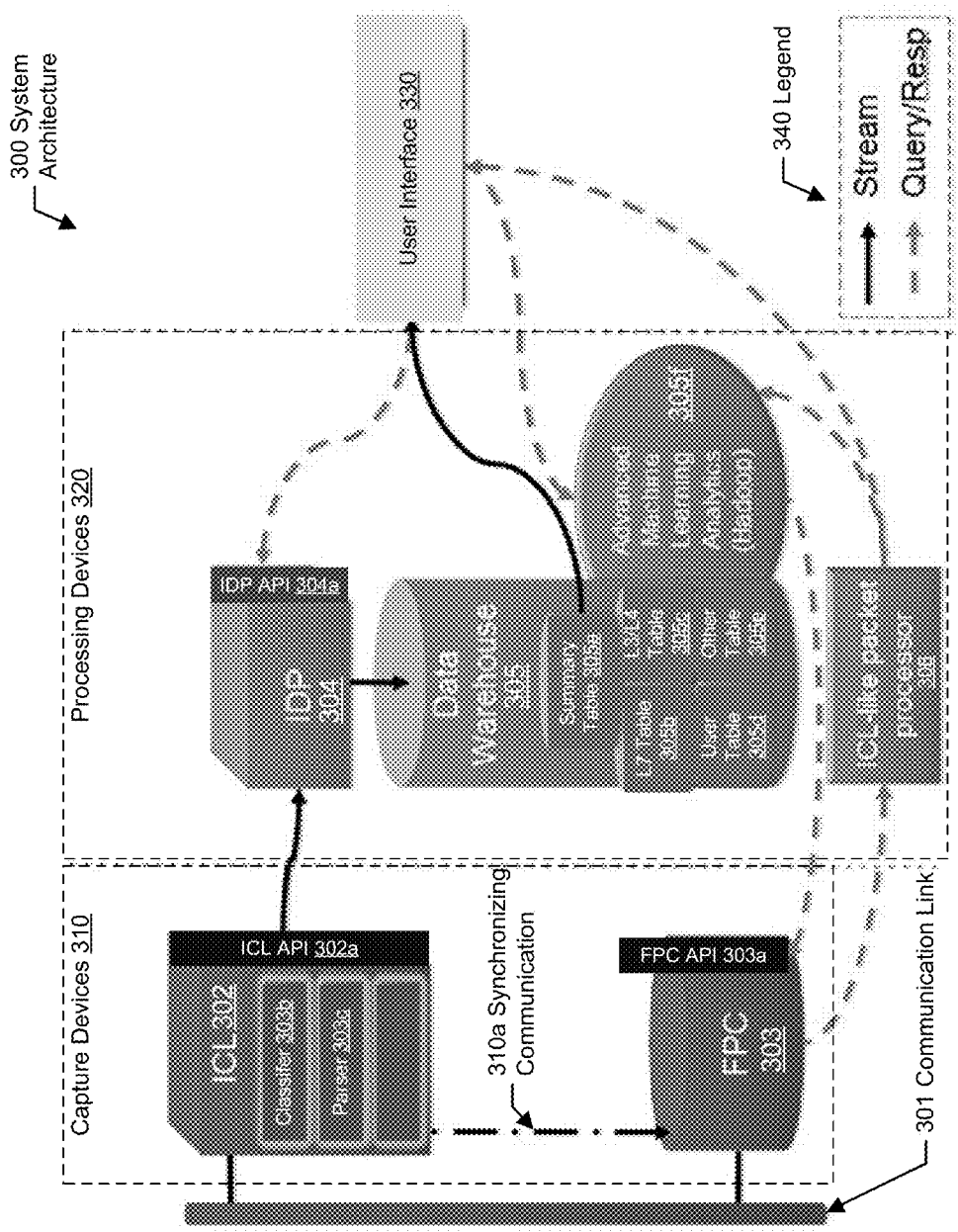
FIG. 3.1

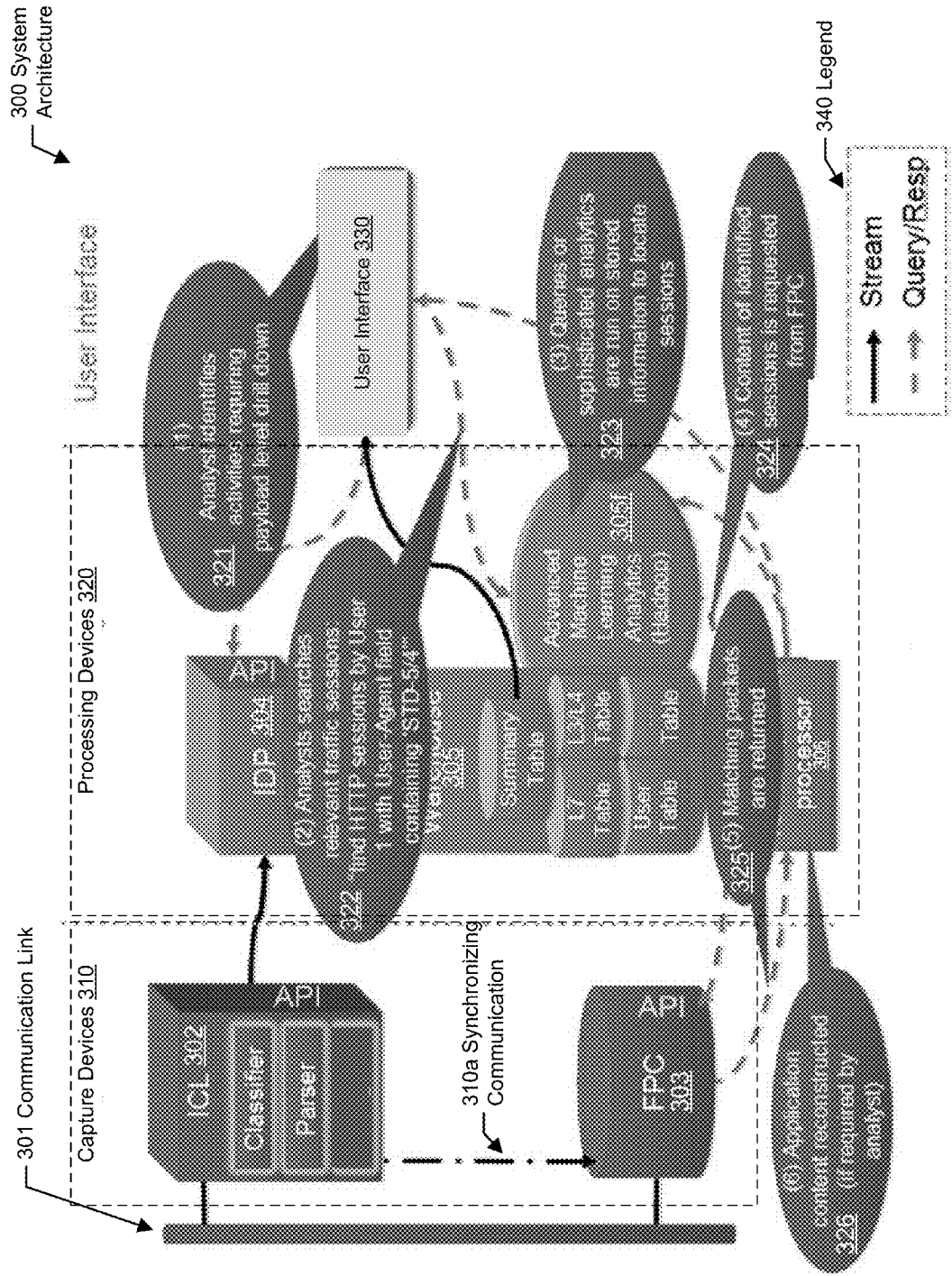
FIG. 3.2

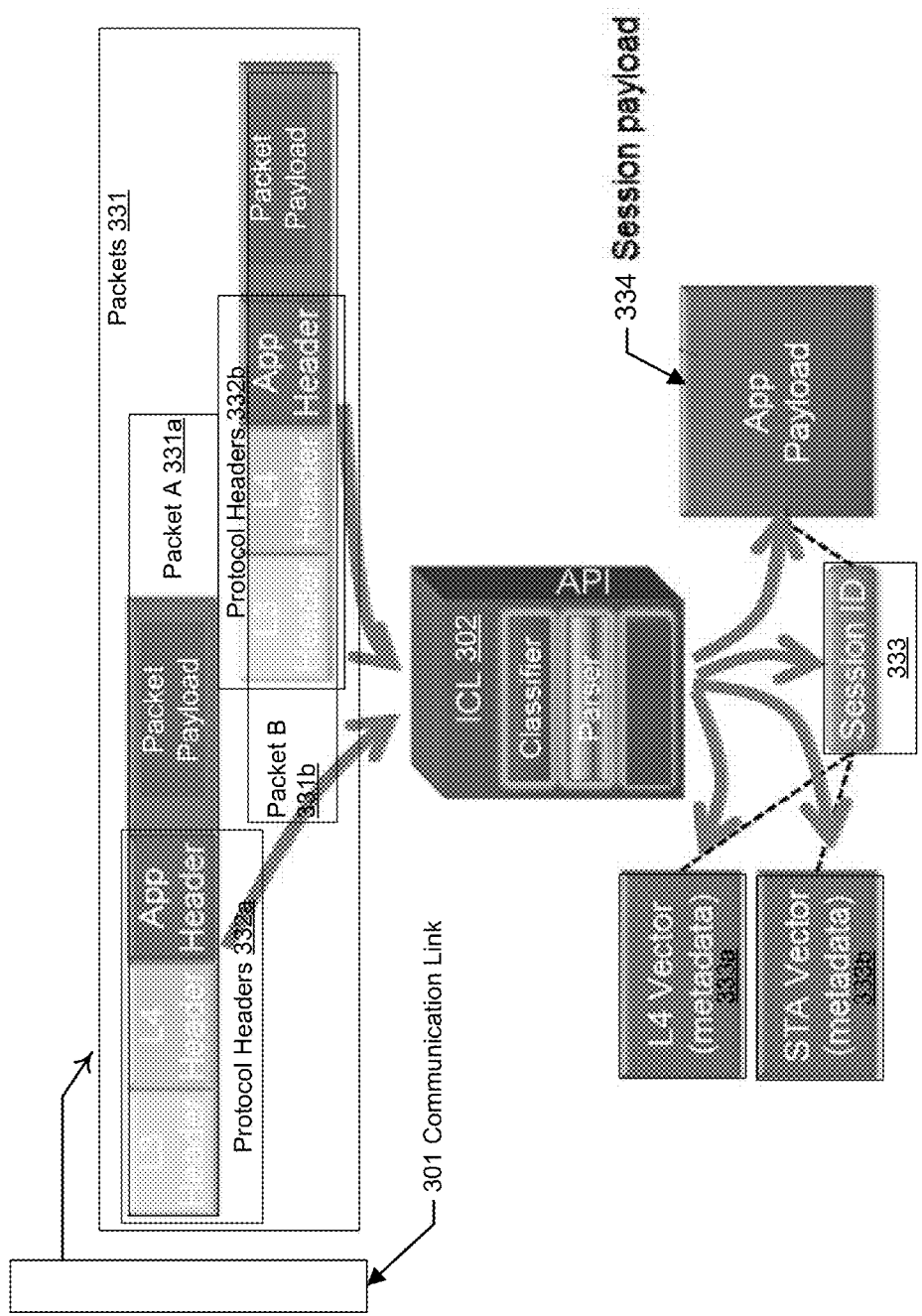
FIG. 3.3

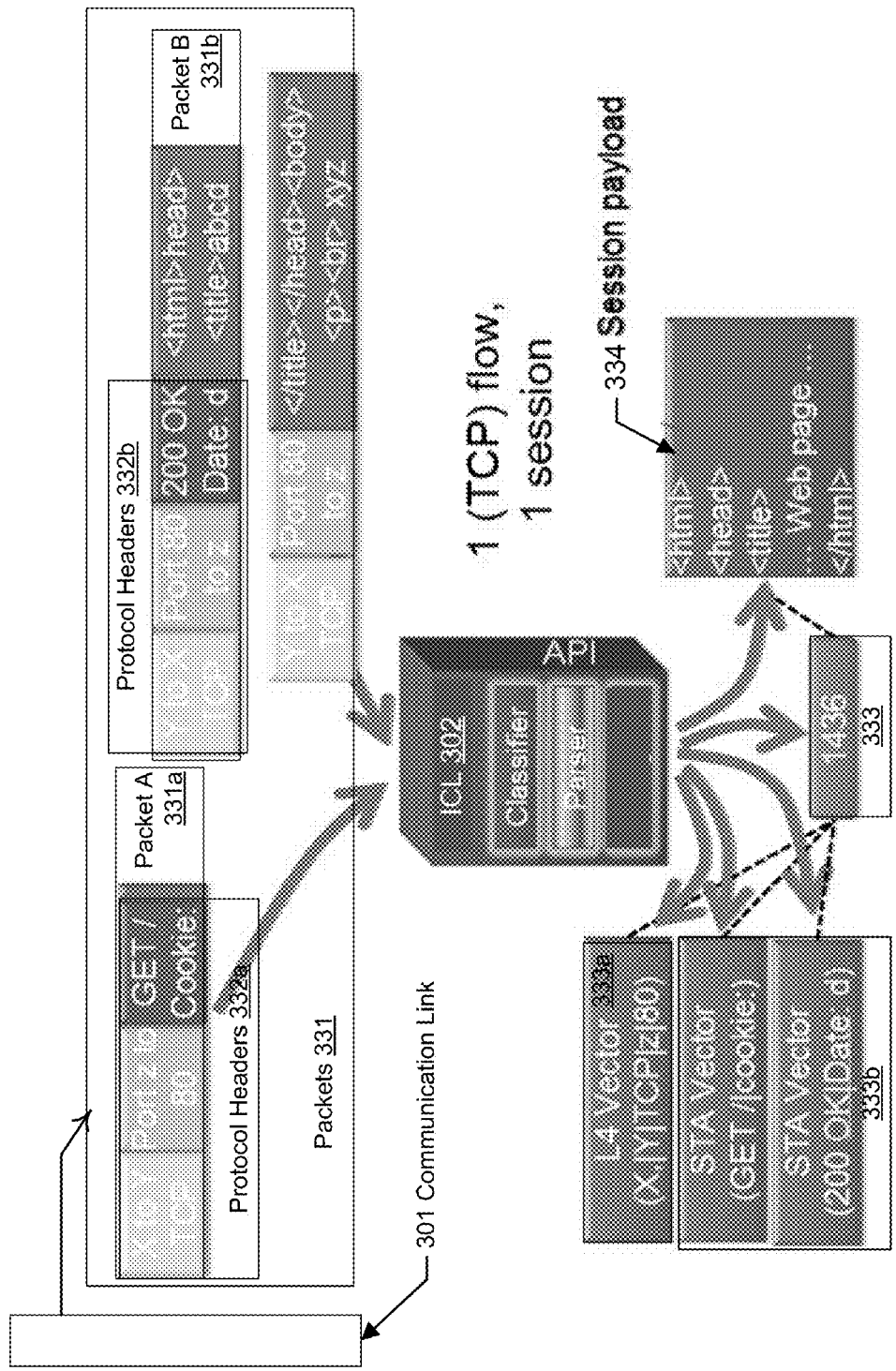
FIG. 3.4

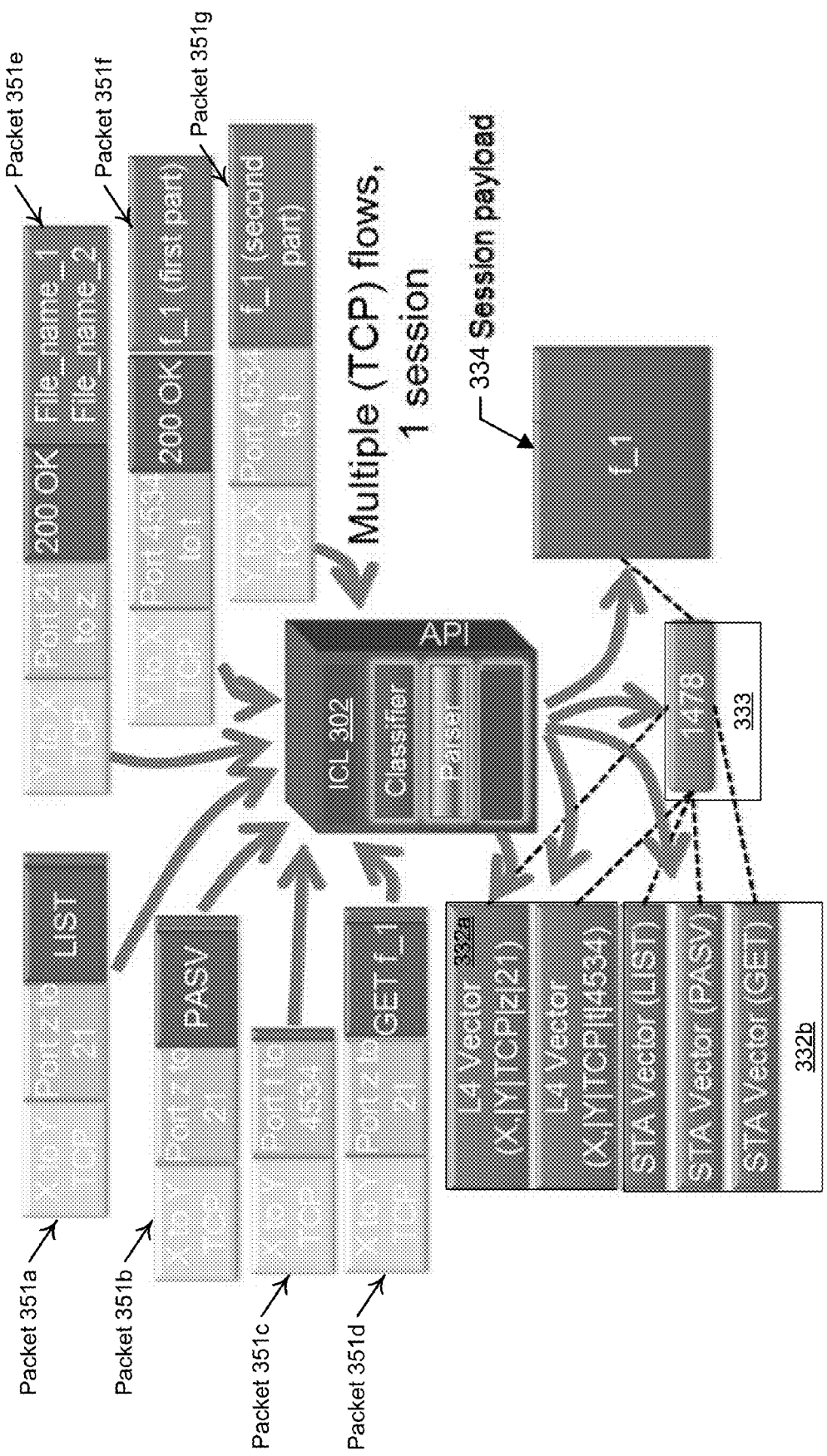
FIG. 3.5

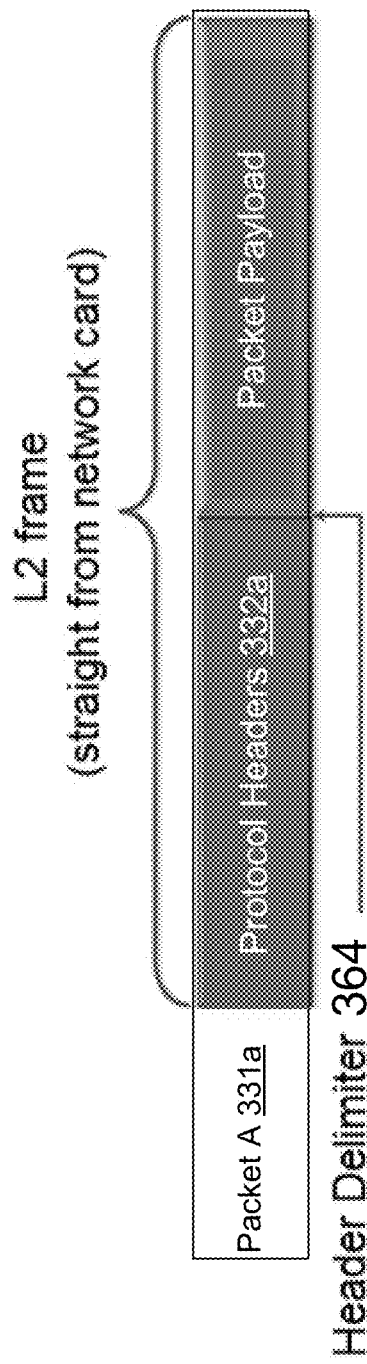
FIG. 3.6

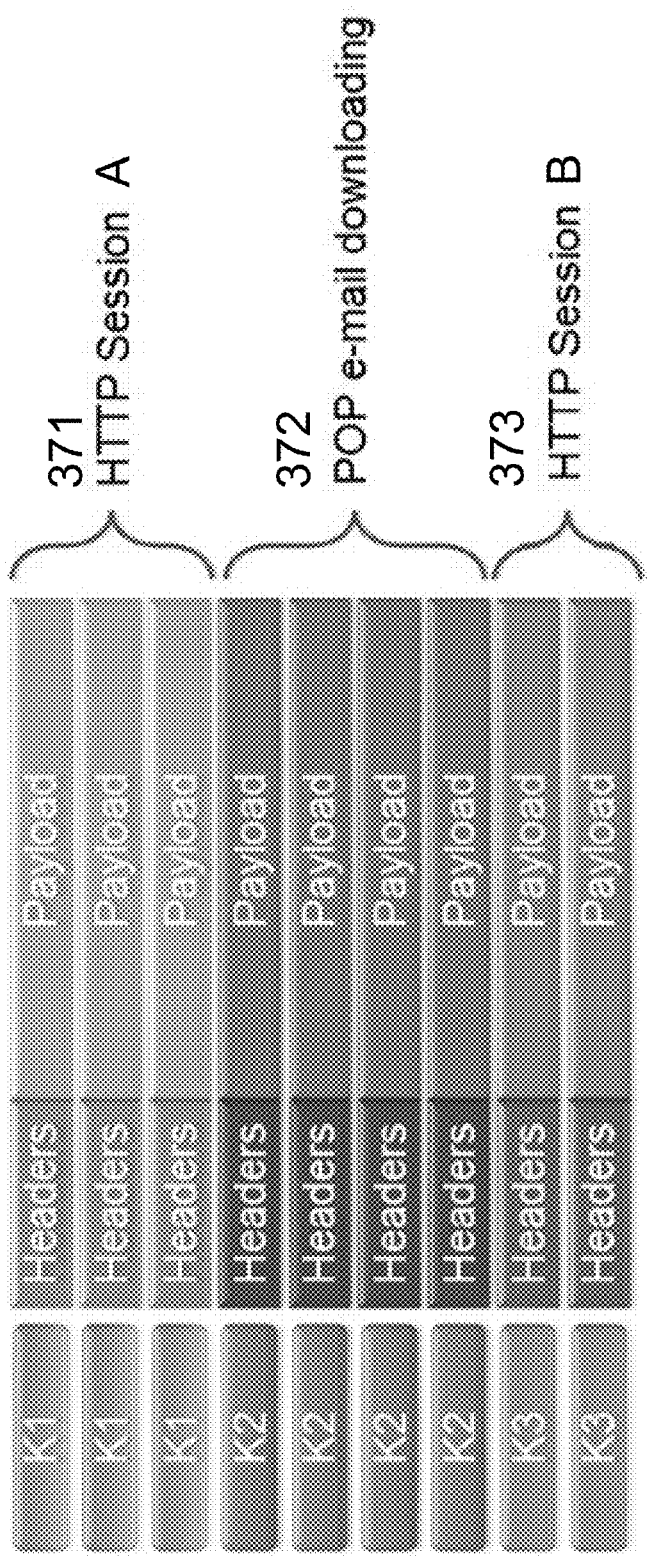
FIG. 3.7

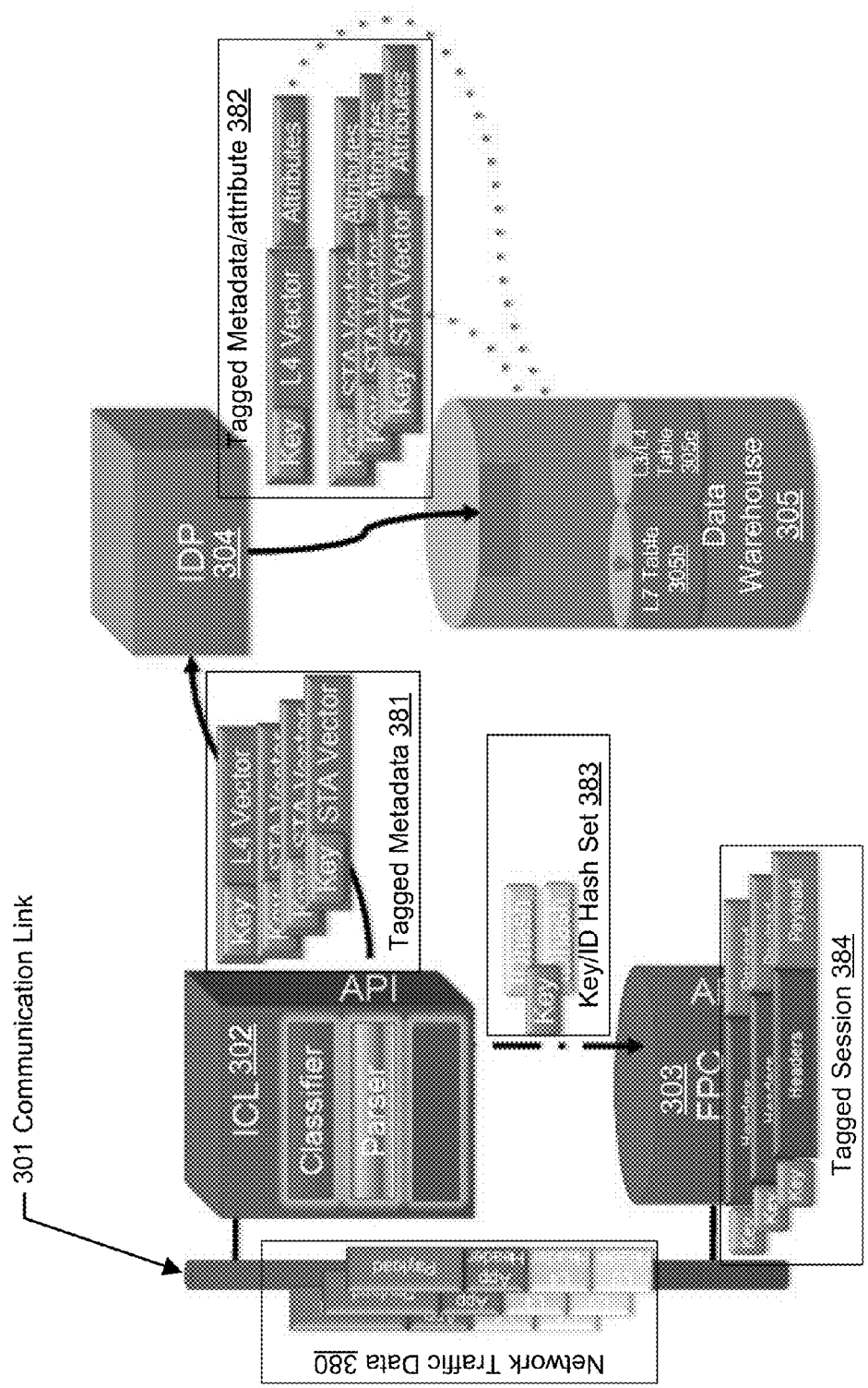
FIG. 3.8

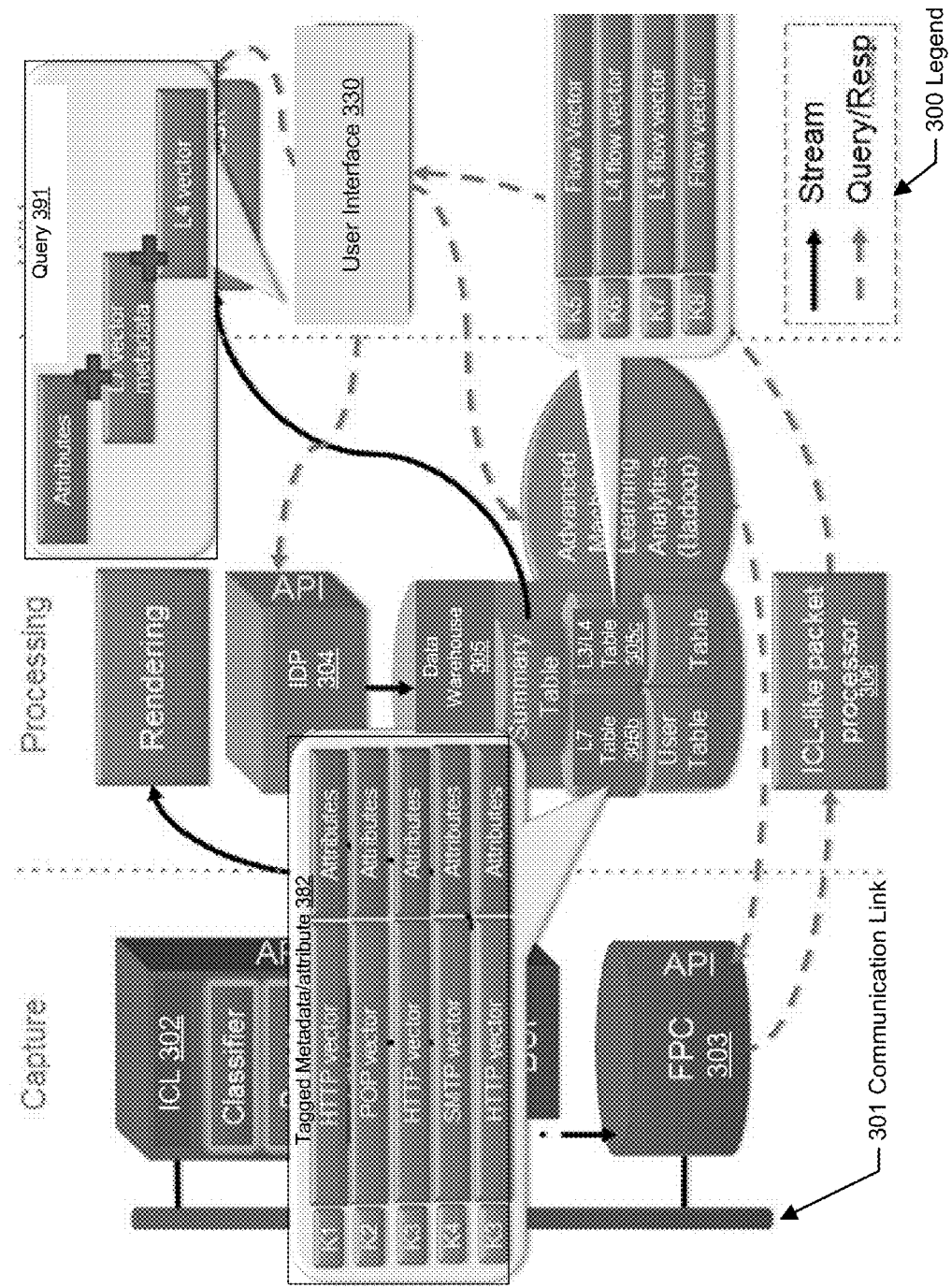
FIG. 3.9

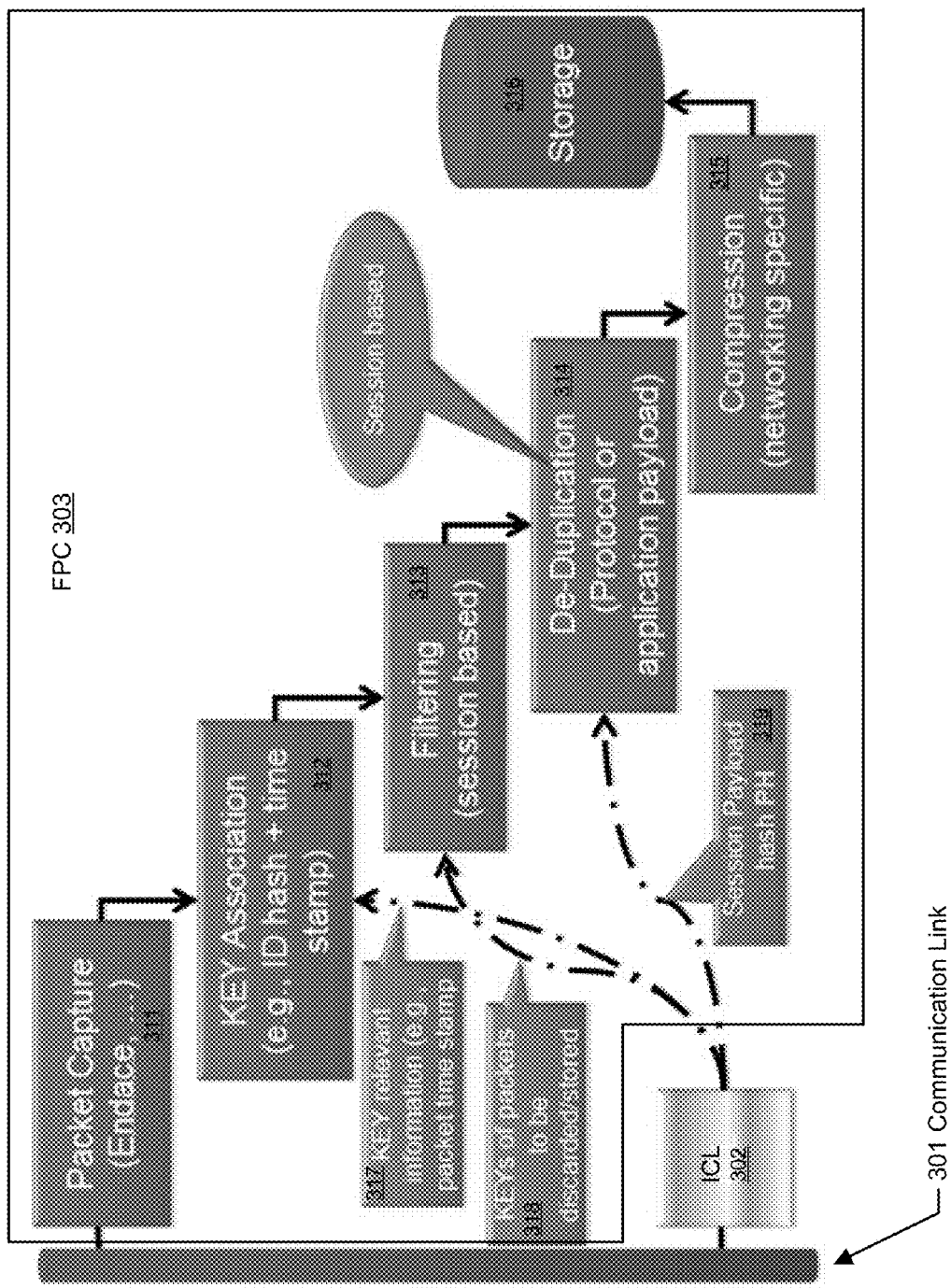
FIG. 3.10

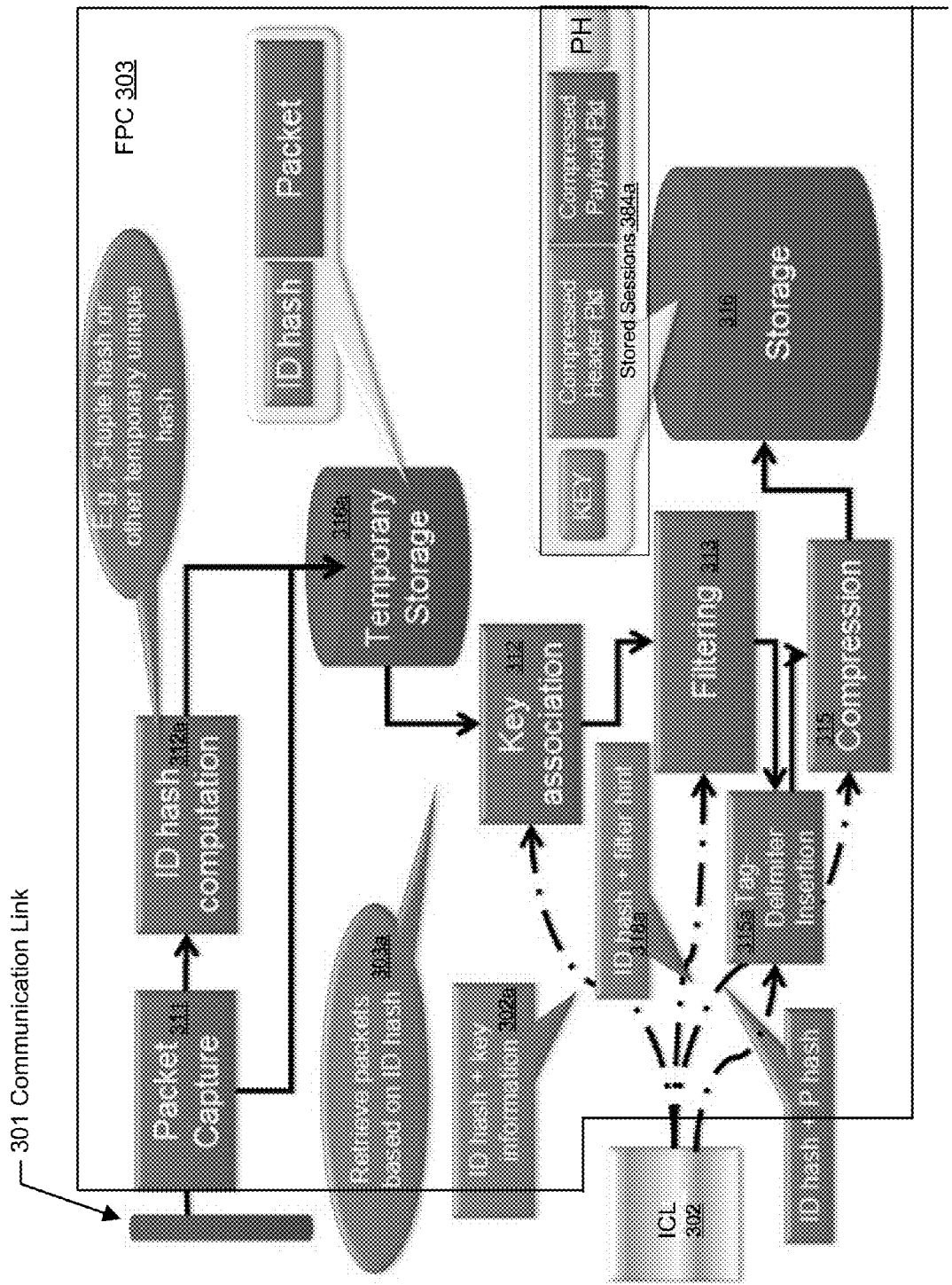
FIG. 3.11

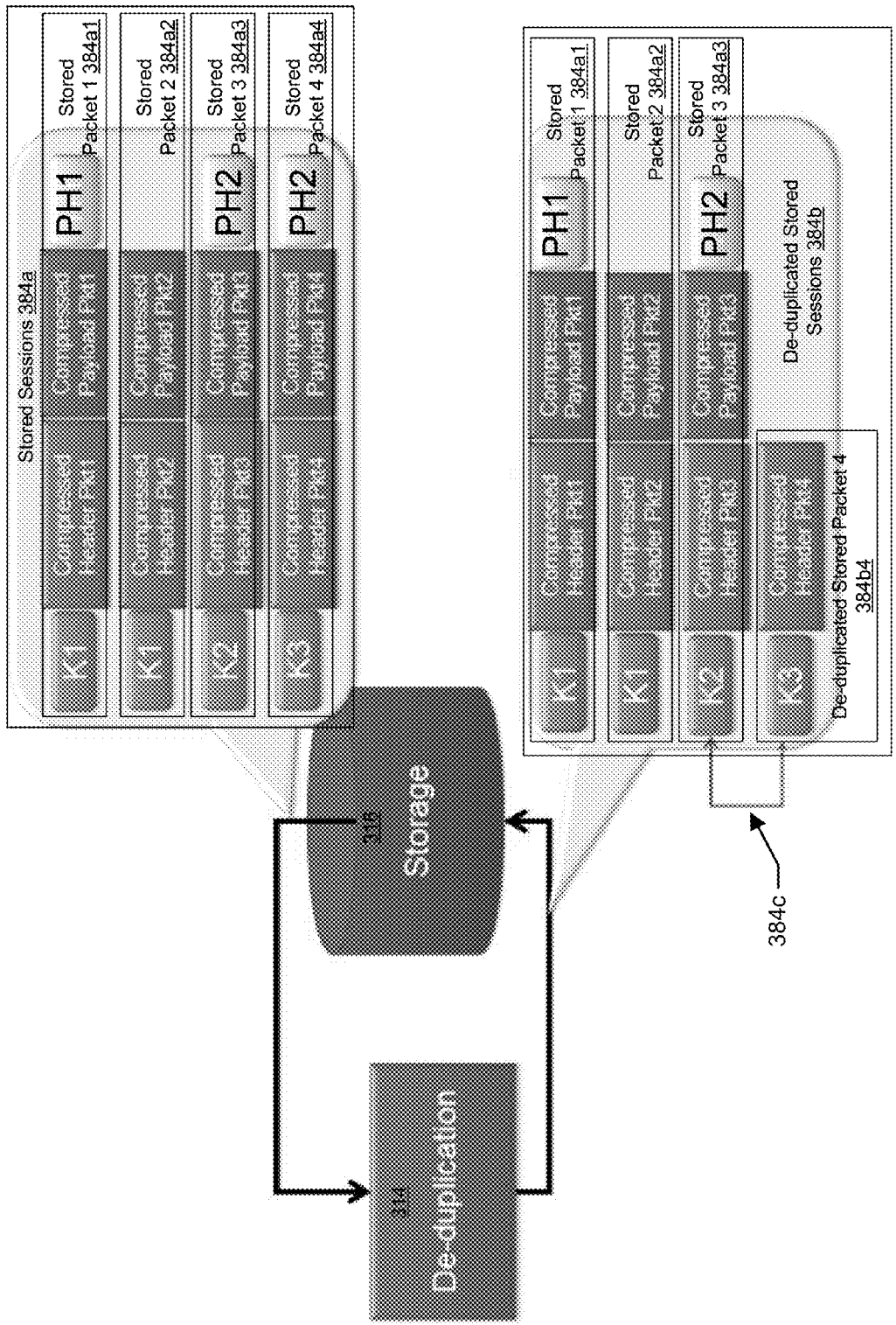
FIG. 3.12

EFFICIENT STORAGE AND FLEXIBLE RETRIEVAL OF FULL PACKETS CAPTURED FROM NETWORK TRAFFIC

BACKGROUND OF THE INVENTION

Given the high data rate of modern computer networks, it is desirable to minimize the amount of stored information in order to keep the network storage requirements within feasible limits.

SUMMARY

In general, in one aspect, the present invention relates to a method for accessing network traffic data of a network. The method includes (i) analyzing, by a computer processor of a network traffic data analysis device, a network traffic data block to generate metadata of the network traffic data block, wherein the network traffic data block comprises a plurality of packets of the network traffic data, wherein the metadata represents at least a portion of the plurality of packets, wherein the network traffic data block is assigned a unique data block identifier, wherein the network traffic data block is assigned a unique data block identifier, (ii) further analyzing, by the computer processor of the network traffic data analysis device and based on a pre-determined algorithm, the network traffic data block to generate at least one packet identifier, wherein the at least one packet identifier identifies from the network traffic data each of the plurality of packets in the network traffic data block, (iii) storing, by a network traffic data access device and concurrently with the network traffic data analysis device generating the metadata and the at least one packet identifier, the network traffic data in a data repository, (iv) receiving, from the network traffic data analysis device by the network traffic data access device, the unique data block identifier in association with the at least one packet identifier, and (v) indexing, by the network traffic data access device and in response to receiving the unique data block identifier and the at least one packet identifier, the network traffic data in the data repository, comprising (a) analyzing, by the network traffic data access device and based on the pre-determined algorithm, an untagged portion of the network traffic data stored in the data repository to determine a first match with the at least one packet identifier, (b) selecting, by the network traffic data access device and based on the first match, the plurality of packets from the network traffic data stored in the data repository, and (c) tagging each of the selected plurality of packets using the unique data block identifier and removing the tagged plurality of packets from the untagged portion of the network traffic data, wherein the plurality of packets are retrieved, from the data repository and in response to a user query, based on the metadata, the unique data block identifier, and the at least one packet identifier.

In general, in one aspect, the present invention relates to a system for accessing network traffic data of a network. The system includes (A) a network traffic data analysis device configured to (i) analyze a network traffic data block to generate metadata of the network traffic data block, wherein the network traffic data block comprises a plurality of packets of the network traffic data, wherein the metadata represents at least a portion of the plurality of packets, wherein the network traffic data block is assigned a unique data block identifier, (ii) further analyze, based on a pre-determined algorithm, the network traffic data block to generate at least one packet identifier, wherein the at least one packet identifier identifies from the network traffic data each of the plurality of packets in the network traffic data block, and (iii) send, to the network traffic data analysis device, the unique data block identifier in association with the at least one packet identifier, (B) a network traffic data access device configured to (i) store, concurrently with the network traffic data analysis device generating the metadata and the at least one packet identifier, the network traffic data in a data repository, (ii) receive, from the network traffic data analysis device, the unique data block identifier in association with the at least one packet identifier, and (iii) index, in response to receiving the unique data block identifier and the at least one packet identifier, the network traffic data in the data repository, comprising (a) analyzing, based on the pre-determined algorithm, an untagged portion of the network traffic data stored in the data repository to determine a first match with the at least one packet identifier, (b) selecting, based on the first match, the plurality of packets from the network traffic data stored in the data repository, and (c) tagging each of the selected plurality of packets using the unique data block identifier and removing the tagged plurality of packets from the untagged portion of the network traffic data, and (C) a data repository for storing the network traffic data, wherein the plurality of packets are retrieved, from the data repository and in response to a user query, based on the metadata, the unique data block identifier, and the at least one packet identifier.

In general, in one aspect, the present invention relates to a computer readable medium storing instructions, when executed by the computer to access network traffic data of a network, the instructions include functionality for (i) analyzing, by a network traffic data analysis device, a network traffic data block to generate metadata of the network traffic data block, wherein the network traffic data block comprises a plurality of packets of the network traffic data, wherein the metadata represents at least a portion of the plurality of packets, wherein the network traffic data block is assigned a unique data block identifier, (ii) further analyzing, the network traffic data analysis device and based on a pre-determined algorithm, the network traffic data block to generate at least one packet identifier, wherein the at least one packet identifier identifies from the network traffic data each of the plurality of packets in the network traffic data block, (iii) storing, by a network traffic data access device and concurrently with the network traffic data analysis device generating the metadata and the at least one packet identifier, the network traffic data in a data repository, (iv) receiving, from the network traffic data analysis device by the network traffic data access device, the unique data block identifier in association with the at least one packet identifier, and (v) indexing, by the network traffic data access device and in response to receiving the unique data block identifier and the at least one packet identifier, the network traffic data in the data repository, comprising (a) analyzing, by the network traffic data access device and based on the pre-determined algorithm, an untagged portion of the network traffic data stored in the data repository to determine a first match with the at least one packet identifier, (b) selecting, by the network traffic data access device and based on the first match, the plurality of packets from the network traffic data stored in the data repository, and (c) tagging each of the selected plurality of packets using the unique data block identifier and removing the tagged plurality of packets from the untagged portion of the network traffic data, wherein the plurality of packets are retrieved, from the data repository and in response to a user query, based on the metadata, the unique data block identifier, and the at least one packet identifier.

Other aspects and advantages of the invention will be apparent from the following description and the appended claims.

BRIEF DESCRIPTION OF DRAWINGS

FIGS. 2.1 and 2.2 show flowcharts of a method according to aspects of the invention.

FIGS. 3.1-3.12 show various examples according to aspects of the invention.

DETAILED DESCRIPTION

Figure 1:
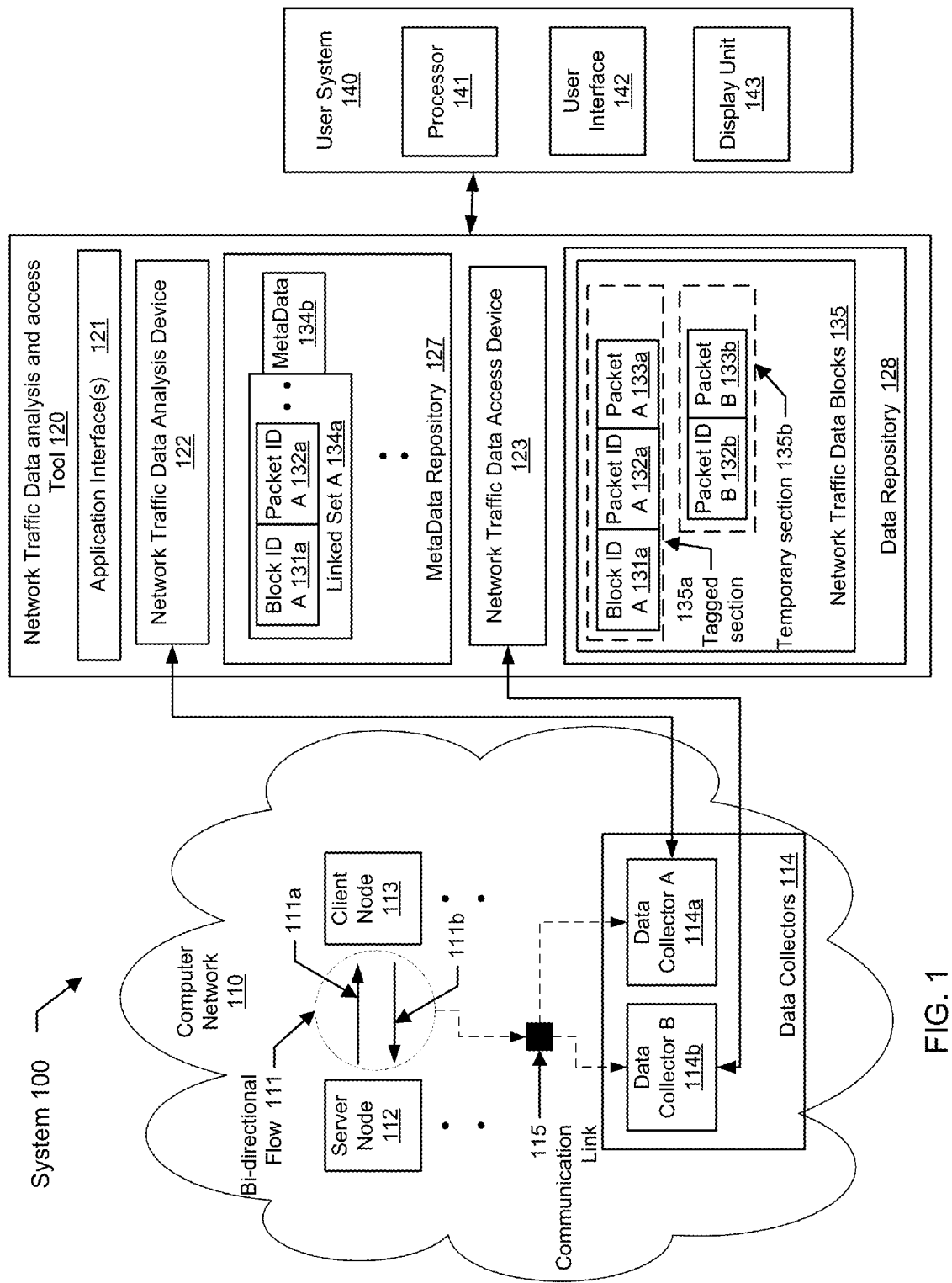
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Application layer sessions can include a single transport layer flow (e.g., a POP session in which a mail client downloads messages from a mail server) or multiple flows (e.g., an FTP client requesting to download a file from a server on the control connection and receiving the file on the data connection). Throughout this disclosure, the terms "application layer session" and "session" may be used interchangeably depending on the context. Similarly, the terms "transport layer flow" and "flow" may be used interchangeably depending on the context.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a session, in an interchangeable manner depending on the context unless explicitly stated otherwise.

Embodiments of the invention provide a system and method for accessing network traffic data of a network. The system and method includes using separate data analysis device and data access device for capturing and analyzing network traffic data blocks (e.g., sessions) concurrently and cooperatively to store and retrieve large amount of high speed network traffic data. In particular, the data analysis device and the data access device are synchronized using a linked set containing unique data block identifier and associated packet identifiers. The synchronization allows the data analysis device to focus on the full packet analysis task and the data access device to focus on the full packet storing and retrieving task without analyzing full packet content.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network traffic data analysis and access tool (120), a user system (140), and a computer network (110). The network traffic data analysis and access tool (120) includes a metadata repository (127), a data repository (128), one or more application interfaces (121), a network traffic data analysis device (122), and a network traffic data access device (123). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collector A (114a), data collector B (114b), etc.), which are devices configured with computing and communication capabilities for executing applications in the network (110).

As shown in FIG. 1, the server node (112) and client node (113) communicate with each other by exchanging data packets forming a bi-directional flow (111), which includes two uni-directional flows (111a) and (111b) represented by two arrows. In one or more embodiments, the data packets of the bi-directional flow (111) travel through a communication link (115), which is a communication media through which data is transmitted, such as a copper cable or an optical fiber. In one or more embodiments, the server node (112) and the client node (113) exchange data packets in the bi-directional flow (111) as a result of an application executing on the server node (112) and the client node (113). In this context, the bi-directional flow (111) is referred to as being generated by the application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113). Although the devices exchanging the data packets in the bi-directional flow (111) are referred to in the description above as server node (112) and client node (113), the bi-directional flow (111) may also be part of peer-to-peer communication.

In one or more embodiments, certain device(s) (e.g., data collector A (114a), data collector B (114b) collectively referred to as data collectors (114)) within the computer network (110) may be configured to collect network data (e.g., bi-directional flow (111)) for providing to the network traffic data analysis and access tool (120). Each of these components is described below. One of ordinary skill in the art will appreciate that embodiments are not limited to the configuration shown in FIG. 1.

In one or more embodiments of the invention, the network traffic data analysis and access tool (120) is configured to interact with the computer network (110) using direct connections to the data collectors (114). The data collectors (114) may be configured to capture data (e.g., bi-directional flow (111)) from the computer network (110) and send captured data to the network traffic data analysis and access tool (120). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and processed by the network traffic data analysis and access tool (120) in real time to be formatted and stored in the metadata repository (127) and/or data repository (128), such as the metadata (134b), packet A (133a), packet B (133b), etc. In one or more embodiments, the data collectors (114) are referred to as tapping devices that intercept and log data traffic passing over the computer network (110) or a portion thereof. Specifically, a tapping device is a device or mechanism to couple a receiver to a communication link in order to read the network traffic data signal without preventing or impairing the reception of the network traffic data (e.g., the bi-directional flow (111)) by the intended recipient (e.g., the server node (112) or the client node (113)).

In one or more embodiments, the data collectors (114) and the network traffic data analysis and access tool (120) may be deployed in the computer network (110) by a network communication service provider (e.g., ISP), a network security service provider, or other business or government entities. The data collector (114) and the network traffic data analysis and access tool (120) may be configured to capture and process network traffic data through an automated process, such as through a direct feed or some other form of automated process. Such network traffic data may be captured and processed on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic data analysis and access tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic data analysis and access tool (120). The user may include, but is not limited to, an individual, a group, an organization, or some other entity having authority and/or responsibility to access the network traffic data analysis and access tool (120). Specifically, the context of the term "user" here is distinct from that of a user of the computer network (110). The user system (140) may be, or may contain a form of, an internet-based communication device that is capable of communicating with the application interface (121) of the network traffic data analysis and access tool (120). Alternatively, the network traffic data analysis and access tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic data analysis and access tool (120) (e.g., report, alert, etc.).

In one or more embodiments, a central processing unit (CPU, not shown) of the network traffic data analysis and access tool (120) is configured to execute instructions to operate the components of the network traffic data analysis and access tool (120). In one or more embodiments, the memory (not shown) of the network traffic data analysis and access tool (120) is configured to store software instructions for performing the functionalities of the network traffic data analysis and access tool (120). The memory may be one of a variety of memory devices, including but not limited to random access memory (RAM), read-only memory (ROM), cache memory, and flash memory. The memory may be further configured to serve as back-up storage for information stored in the data repository (127).

The network traffic data analysis and access tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic data analysis and access tool (120) is configured to obtain and store data in the metadata data repository (127) and the data repository (128). In one or more embodiments, each of the metadata data repository (127) and the data repository (128) is a persistent storage device (or set of devices). The metadata data repository (127) and the data repository (128) are also configured to deliver working data to, and receive working data from, the network traffic data analysis device (122) and the network traffic data access device (123). Each of the metadata data repository (127) and the data repository (128) may be a database, a file system, one or more data structures configured in a memory, some other medium for storing data, or any suitable combination thereof. The metadata data repository (127) and the data repository (128) may include a device internal to the network traffic data analysis and access tool (120). Alternatively, the metadata data repository (127) and the data repository (128) may include an external storage device operatively connected to the network traffic data analysis and access tool (120).

In one or more embodiments, the network traffic data analysis and access tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic data analysis and access tool (120) is configured to support various data formats provided by the user system (140).

In one or more embodiments, the network traffic data analysis and access tool (120) includes the network traffic data analysis device (122) that is configured to (i) analyze a network traffic data block (e.g., a session) to generate metadata (e.g., meta data (134b)) of the network traffic data block, wherein the network traffic data block is uniquely identified by a unique data block identifier (e.g., block ID A (131a)), (ii) further analyze the network traffic data block to generate at least one packet identifier (e.g., packet ID A (132a)), each packet identifier uniquely identifying one packet in the network traffic data block, and (iii) send, to the network traffic data analysis device (123), the unique data block identifier (e.g., block ID A (131a)) in association with the at least one packet identifier (e.g., packet ID A (132a)) in a linked set (e.g., linked set A (134a)). In one or more embodiments of the invention, all packet identifiers (e.g., packet ID A (132a)) and metadata (e.g., metadata (134b)) of the network traffic data block are stored in association with the unique data block identifier (e.g., block ID A (131a)) of the network traffic data block in the metadata repository (127).

Additional details of the functionalities of the network traffic data analysis device (122) are described in reference to FIGS. 2.1, 2.2, and 3.1 through 3.12 below.

In one or more embodiments, the network traffic data analysis and access tool (120) includes the network traffic data access device (123) that is configured to (i) initially store, concurrently with the network traffic data analysis device (122) generating the metadata (e.g., meta data (134b)) and the at least one packet identifier (e.g., packet ID A (132a)), full packet network traffic data (e.g., packet A (133a), packet B (133b)) in a temporary section (135b) of the data repository (128), (ii) receive, from the network traffic data analysis device (122), a linked set (e.g., linked set (134a)), and (iii) index, in response to receiving the unique data block identifier (e.g., block ID A (131a)) and the at least one packet identifier (e.g., packet ID A (132a)) in the linked set (e.g., linked set (134a)), the network traffic data (e.g., packet A (133a), packet B (133b)) in the data repository (128). In one or more embodiments of the invention, indexing the network traffic data (e.g., packet A (133a), packet B (133b)) includes using appropriate unique data block identifier (e.g., block ID A (131a)) to tag data packets (e.g., packet A (133a), packet B (133b)) initially stored in the temporary section (135b) of the data repository (128) that are determined as belonging to the network traffic data block uniquely identified by the unique data block identifier (e.g., block ID A (131a)) in the linked set (e.g., linked set (134a)). Specifically, the data packets stored in the temporary section of the data repository (128) are compared to the at least one packet identifier (e.g., packet ID A (132a)) in the linked set (e.g., linked set (134a)) to determine which data packet(s) belongs to the network traffic data block uniquely identified by the unique data block identifier (e.g., block ID A (131a)) in the linked set (e.g., linked set (134a)). The tagged packets (e.g., packet A (133a)) are then removed from the temporary section (135b) of the data repository (128) into a tagged section (135a) of the data repository (128).

Additional details of the functionalities of the network traffic data access device (123) are described in reference to FIGS. 2.1, 2.2, and 3.1 through 3.12 below.

FIGS. 2.1 and 2.2 depict flowcharts of a method in accordance with one or more embodiments of the invention. In one or more embodiments of the invention, one or more of the steps shown in FIGS. 2.1 and 2.2 may be omitted, repeated, and/or performed in a different order. Accordingly, embodiments of the invention should not be considered limited to the specific arrangements of steps shown in FIGS. 2.1 and 2.2. In one or more embodiments of the invention, the method depicted in FIGS. 2.1 and 2.2 may be practiced using system (100) described with respect to FIG. 1 above.

FIG. 2.1 shows a flowchart (200) in accordance with one or more embodiments of the invention. Specifically, the flowchart (200) describes an example method where separate data analysis device and data access device capture and analyze network traffic data blocks concurrently and cooperatively to store and retrieve large amount of high speed network traffic data. In one or more embodiments of the invention, the data analysis device and the data access device are synchronized using a linked set containing unique data block identifier and associated packet identifiers. The synchronization allows the data analysis device to focus on the full packet analysis task and the data access device to focus on the full packet storing and retrieving task without analyzing full packet content.

Initially in Step 201, a data block of network traffic data (referred to as a network traffic data block) is captured and analyzed by a data analysis device (e.g., the network traffic data analysis device (122) depicted in FIG. 1 above) to generate metadata of the network traffic data block.

In one or more embodiments of the invention, the network traffic data block is a session (i.e., an application layer session) captured from the network traffic (e.g., Internet data traffic) by the data analysis device. In particular, the network traffic data block includes a collection of packets of the network traffic data, such as the transport layer packets of the session.

In one or more embodiments, the metadata represents at least a portion of the collection of packets, and the network traffic data block is assigned a unique data block identifier. For example, the metadata may include an extracted portion of the network traffic data block and an attribute inferred from the network traffic data block. Specifically, the metadata may include a particular packet or a protocol field of a packet extracted from the session.

In one or more embodiments, the network traffic data block is uniquely identified by a unique data block identifier that is assigned to the network traffic data block. For example, the unique data block identifier may be a session ID assigned by the network protocol of the network traffic. In another example, the unique data block identifier may be generated by the data analysis device and assigned to the network traffic data block. In one or more embodiments, the unique data block identifier is generated based on the metadata of the network traffic data block. In one or more embodiments, the unique data block identifier is generated based on a random sequence number generation algorithm. In one or more embodiments, the unique data block identifier is referred to as a key assigned or tagged to the network traffic data block.

In one or more embodiments, in response to generating the metadata, the data analysis device stores the metadata referenced by the unique data block identifier in a metadata repository. For example, the metadata of a session is stored in the metadata repository and referenced by the unique data block identifier of the session.

Examples of the data analysis device capturing the network traffic and generating/storing the metadata and attributes are described in reference to FIGS. 3.1-3.12 below. In at least a portion of FIGS. 3.1-3.12, the data analysis device is referred to as the ICL, the metadata and attributes are referred to as vectors, the metadata repository is referred to as the data warehouse, and the unique data block identifier is referred to as the key.

In Step 202, the network traffic data block is further analyzed by the data analysis device, and based on a pre-determined algorithm, to generate a packet identifier for each packet of the collection of packets in the network traffic data block. Specifically, each packet identifier is assigned to a corresponding packet captured from the network traffic to uniquely identify the corresponding packet. In one or more embodiments of the invention, the packet identifier is a hash value of the corresponding packet. For example, the hash value may be calculated based on the entire content of the corresponding packet or a portion thereof.

In one or more embodiments, in response to generating the metadata and the packet identifier, the data analysis device stores the packet identifier for each packet of the network traffic data block in the metadata repository. Specifically, the packet identifiers for all packets of the network traffic data block are referenced by the unique data block identifier. In one or more embodiments, both the metadata of the network traffic data block as well as the packet identifiers for all packets of the network traffic data block are stored in one or more data structures and are indexed by the unique data block identifier.

Examples of the data analysis device generating/storing the packet identifiers are described in reference to FIGS. 3.1-3.12 below. In at least a portion of FIGS. 3.1-3.12, the data analysis device is referred to as the ICL, the packet identifiers are referred to as the ID hash, and unique data block identifier is referred to as the key.

In Step 203, the network traffic data block is analyzed by a data access device (e.g., the network traffic data access device (123) depicted in FIG. 1 above) based on the pre-determined algorithm to generate a data access device version of the packet identifier for each packet of the collection of packets in the network traffic data block. In one or more embodiments of the invention, the network traffic data block is separately captured by the data analysis device and the data access device. For example, the data analysis device and the data access device may tap the same communication link, or even using the same tapping point on the communication link, to separately and concurrently capture the network traffic data block from the network traffic traveling through the communication link.

Examples of the data access device separately generating the packet identifiers are described in reference to FIGS. 3.1-3.12 below. In at least a portion of FIGS. 3.1-3.12, the data access device is referred to as the FPC, the separately generated packet identifiers are referred to as the ID hash.

In Step 204, concurrently with the data analysis device generating the metadata and the packet identifier, the network traffic data is captured and stored by the data access device in a data repository. Generally, multiple network traffic data blocks are captured from the network traffic data for storing in the data repository. In one or more embodiments of the invention, the captured network traffic data is initially stored in a temporary section of the data repository waiting to be indexed based on information from the data analysis device.

Examples of the data access device separately capturing the network traffic data for initially storing in the temporary section of the data repository are described in reference to FIGS. 3.1-3.12 below. In at least a portion of FIGS. 3.1-3.12, the data repository is represented as part of the data access device. Further, the temporary section of the data repository is referred to as the temporary storage (316*a*), while the remainder section of the data repository is referred to as the storage (316) in FIG. 3.11.

Step 205, the aforementioned unique data block identifier of the network traffic data block and the packet identifier for each packet of the collection of packets in the network traffic data block are received as a linked set by the data access device from the data analysis device. In one or more embodiments of the invention, the linked set may be in any suitable data structure.

Examples of the linked set received by the data access device from the data analysis device are described in reference to FIGS. 3.1-3.12 below. In particular, the linked set is referred to as the key/ID hash set in FIG. 3.8.

In Step 206, the network traffic data in the data repository is indexed by the network traffic data access device in response to receiving the linked set of the unique data block identifier and the packet identifier(s). Specifically, the packets of each network traffic data block stored in the data repository are indexed by the network traffic data access device using an applicable linked set of the unique data block identifier and the packet identifier(s) received from the data analysis device.

In one or more embodiments of the invention, the indexing action uses the unique data block identifier to tag certain packets stored in the data repository to indicate the tagged packets as belonging to the network traffic data block identified by the unique data block identifier. In one or more embodiments, the indexing is performed by the following:

(i) For each packet identifier in the linked set received from the data analysis device, the data access device analyzes packets in an untagged portion of the network traffic data stored in the data repository to determine a match with the packet identifier. Based on the unique data block identifier included in the linked set, the packet where the match is found is determined as belonging to the network traffic data block identified by the unique data block identifier.

In one or more embodiments, while determining the match, the packets in the untagged portion of the network traffic data stored in the data repository are analyzed to generate data access device versions of packet identifiers based on the same pre-determined algorithm used by the data analysis device in generating the packet identifiers. Accordingly, the match is determined based on a comparison between the packet identifier received in the linked set and the as generated data access device version of the packet identifier.

In one or more embodiments, while initially being stored in the temporary section of the data repository, the packets are analyzed to generate data access device versions of packet identifiers based on the same pre-determined algorithm used by the data analysis device in generating the packet identifiers. In one or more embodiments, the data access device version of packet identifiers are generated and stored in association with the untagged packets prior to the data access device receiving the corresponding linked set from the data analysis device. Accordingly, the aforementioned match is determined based on a comparison between the packet identifier received in the linked set and the previously generated data access device version of the packet identifier.

(ii) For each linked set received from the data analysis device, the data access device selects, from the network traffic data stored in the data repository, all packets determined as belonging to the network traffic data block identified by the unique data block identifier based on matches found above, (iii) For each linked set received from the data analysis device, the data access device (a) tags each of the selected packets using the unique data block identifier received in the linked set, and (b) removes the now tagged packets from the untagged portion of the network traffic data. In one or more embodiments, the untagged portion of the network traffic data is stored in the temporary section of the data repository. Once removed from the untagged section, the tagged packets are stored in a remaining section (or permanent section) of the data repository.

In one or more embodiments, the indexing described above is performed according to the flowchart (210) depicted in FIG. 2.2 below.

In one or more embodiments of the invention, the linked set used to synchronize the data analysis device and the data access device includes additional information. In one or more embodiments, the additional information includes packet header delimiters that are generated by the network traffic data analysis device analyzing the network traffic data block. In particular, the packet header delimiter identifies a boundary between a header and a payload of a packet in the captured network traffic data block. In one or more embodiments, the packet header delimiters are received by the data access device via the linked set and used to compress the packet more efficiently before storing in the data repository.

In one or more embodiments, the additional information further includes packet payload attributes that are generated by the network traffic data analysis device analyzing the network traffic data block. In particular, the packet payload attributes represent characteristics of a packet payload in the network traffic data block. In one or more embodiments, the packet payload attributes are received by the data access device via the linked set and used to filter the packets before storing in the data repository.

Examples of the indexing, packet compression, and packet filtering by the data access device are described in reference to FIGS. 3.1-3.12 below. In particular, an example of the packet filtering is described in FIGS. 3.10-3.12 as de-duplication.

In Step 207, in response to receiving a user query requesting certain network traffic data from the data repository, the data analysis device compares the user query with contents of the metadata repository to determine a match with the metadata. In one or more embodiments of the invention, the user query includes criteria specifying characteristics of the network traffic data to be retrieved from the data repository.

In Step 208, the network traffic data analysis device retrieves from the metadata repository and based on the match found in Step 207, the unique data block identifier of a network traffic data block that satisfies the criteria contained in the user query. In other words, the retrieved unique data block identifier uniquely identifies the network data block having characteristics matching the user query criteria. Accordingly, this retrieved unique data block identifier is sent to the data access device for retrieving stored packet data.

In Step 209, the network traffic data access device retrieves, from the data repository and in response to receiving the unique data block identifier from the data analysis device, the packets tagged by the unique data block identifier in the data repository. Accordingly, in Step 210, the network traffic data access device provides, as a result of the user query, the retrieved packets to a user who submits the user query.

FIG. 2.2 shows a flowchart (210) in accordance with one or more embodiments of the invention. Specifically, the flowchart (210) describes an example method for the data access device to index the stored packets in the data repository.

Initially in Step 211, the data access device determines, while capturing and storing full packets into an untagged section of a data repository, whether any linked set is received from the data analysis device. In one or more embodiments of the invention, the untagged section of a data repository is referred to as a temporary data repository. If the determination is negative, i.e., no linked set is received, the method continues in Step 211 to capture and store full packets while waiting for any linked set to be sent by the data analysis device. If the determination is positive, i.e., a linked set is received, the method proceeds to Step 212. In one or more embodiments, the linked set includes a unique data block identifier and one or more packet identifiers identifying packets in the data block that is uniquely identified by the unique data block identifier. In one or more embodiments, the unique data block identifier and the one or more packet identifiers are assigned to the data block and packets contained in the data block by the data analysis device. In particular, the packet identifier is generated by the data analysis device analyzing a corresponding packet using a pre-determined algorithm to uniquely identify the corresponding packet.

In Step 212, the data access device retrieves a packet identifier from the received link set and the method proceeds to Step 213.

In Step 213, the data access device analyzes a packet stored in the untagged section of the data repository to generate a data access device version of the packet identifier. Specifically, the data access device generates the data access device version of the packet identifier using the same pre-determined algorithm that is used by the data analysis device to generate the packet identifiers included in the linked set.

In Step 214, the data access device version of the packet identifier is compared to the packet identifier retrieved from the received link set in Step 212 above to determine whether there is a match. If the determination is negative, i.e., no match is determined based on the comparison, the method proceeds to Step 216. If the determination is positive, i.e., a match is determined based on the comparison, the method proceeds to Step 215.

In Step 215, the data access device uses the unique data block identifier received in the linked set to tag the packet, of which the data access device version of the packet identifier matches the packet identifier retrieved from the received link set. The method then proceeds to Step 216

In Step 216, a determination is made as to whether there is any packet not yet checked for match (i.e., via Step 214) in the untagged section of the data repository. If the determination is negative, i.e., no more packet left, the method proceeds to Step 218. If the determination is positive, i.e., at least one packet not yet checked for match (i.e., via Step 214) remains in the untagged section, the method proceeds to Step 217 where a remaining packet not yet checked for match is selected for returning to Step 213.

In Step 218, a determination is made as to whether to continue. If the determination is negative or not to continue, the method ends. If the determination is positive or to continue, the method returns to Step 211.

FIGS. 3.1-3.12 show various examples in accordance with aspects of the invention. The examples shown in FIGS. 3.1-3.12 relate to full packet capture (FPC) functionality that enables storing of packets, including their headers and payload, that are captured on a computer network. Given the high data rate of modern computer networks, the examples shown in FIGS. 3.1-3.12 minimize duplication of stored information in order to keep the storage space requirements within feasible limits. In particular, the examples described in FIGS. 3.1-3.12 make use of compression and/or de-duplication of information.

FIG. 3.1 shows an example system architecture (300), including components and data flows, in accordance with aspects of the invention. In one or more embodiments, the example system architecture (300) is based on the system (100) shown in FIG. 1 and flowchart (200) shown in FIG. 2 above.

As shown in FIG. 3.1, the example full packet capture devices (310) are deployed close to the communication link (301) (i.e., the communication medium being tapped from which traffic is captured) in order to reduce retransmitting the captured data through the network, which would effectively duplicate the traffic. On the other hand, the processing devices (320) and the user interface (330) used to access (e.g., analyze, store, retrieve, etc.) the stored full packets may be remote from the tapped communication medium (i.e., the communication link (301)) due to space and power limitation of the facilities (e.g., point of presence, or POP, of Internet service providers or communication providers and central offices of telecommunication service providers) that normally host the tapped communication medium (i.e., the communication link (301)).

In order to avoid frequently moving large amounts of data from the storage memory within the FPC (303) to the processing devices (320), (e.g., devices running Advanced machine learning analytics (305f), the ICL-like packet processor (306), etc.) and the user interface (330) that need access to full packet data, full packets are retrieved from the storage memory within the FPC (303) according to sophisticated criteria so that the transfer may be as selective as possible.

Given the large amount of stored full packets, indexing based on search criteria is used for efficient retrieval. For example, to enable the processing devices (320) and the user interface (330) to retrieve all packets with a value V in the source address field of the IP header, an index allowing fast identification of all packets that have a given value in the source address field of the IP header is created and maintained. For example, one or more different indices may be maintained for each header field or other derivative of a header field (e.g., a sub-field, the combination of multiple fields, or the result of the evaluation of a function of one or more header fields). Specifically, creating such indices includes parsing the packet headers to identify the fields and their values, which is a very resource intensive and complex operation.

When capturing traffic on the communication link (301) with very high data rate, the capturing and storing operations are also very resource demanding in terms of random access memory (RAM), computer processor, long-term storage space (e.g., solid state disk, or SSD, or magnetic disk space), and internal data transfer bandwidth between capture interface card(s) tapping the communication link (301) and the RAM, processor, etc. of the capture devices (310).

In order to keep the resource requirements within practical limits, the capture devices (310) include FPC (303) dedicated for capturing and storing full packet data and a separate device (i.e., ICL (302)) dedicated for protocol header parsing and index creation/maintenance. In other words, the full packets capture device FPC (303) performs full packets capture with minimal indexing information (e.g., limited or no header parsing), while enabling retrieval based on arbitrarily complex queries. In order to achieve this, the FPC (303) is coupled (represented by the arrow labeled as synchronization communication (310a)) with the protocol packet header parsing device ICL (302), that extracts the content of protocol header fields at various layers of the ISO/OSI protocol model ranging from the physical to the application layer, as well as application control information and data (or payload). The extracted content generated by the ICL (302) is referred to as metadata and is stored in the data warehouse (305).

As shown in FIG. 3.1, the ICL (302) reconstructs data flows captured from the communication link (301) encompassing multiple related packets and sessions encompassing multiple related flows, and other complex associations of data units to extract metadata from them. Metadata is obtained from the value contained within the various protocol fields that are identified by means of a parser (303c) module that parses the headers of all of the involved protocols based on their specification. In one or more embodiments, a classifier module (303b) is used to identify, by means of classification rules provided by the analyst user, (i) flows, sessions and other complex associations to be parsed or not and (ii) flows, sessions and other complex associations whose extracted metadata is to be delivered to the processing devices (320) or to be discarded. In one or more embodiments, the classifier (303b)

module may be used to provide an indication to the parser (303a) module as to which parsing rules to apply to given flows, sessions and other complex associations. In one or more embodiments, the classifier (303b) module may be used to identify flows, sessions and other complex associations whose packets are to be stored by the FPC module (303) or not. In addition, the ICL (302) may also include a programmable filtering functionality to select and limit the network traffic to be captured and/or processed, or to select and limit the network traffic whose metadata is to be passed on to an intelligent data processing module, referred to as IDP (304). The IDP (304) receives metadata from the ICL (302) for further processing (e.g., refining, selecting, enriching, sorting, etc.) in a streaming fashion.

Also shown in FIG. 3.1, the data warehouse (305) is used to store the metadata that is organized in separate repositories or tables, such as the summary table (305a), layer 7 table (305b), layer 3/layer 4 table (305c), user table (305d), and other table (305e). In general, the metadata may include a portion of header data or payload data, selectively chosen for specific packets, flows, sessions, applications, or other data units. Specifically, the summary table (305a) contains summarized information and statistics on the traffic captured by the ICL (302) and processed by the IDP (304), the layer 7 table (305b) contains layer 7 protocol metadata and/or application specific metadata according to the ISO/OSI protocol model, the layer 3/layer 4 table contains layer 3 and layer 4 protocol metadata according to the ISO/OSI protocol model, the user table contains data related to users originating the traffic, and the other table (305e) contains other relevant metadata.

Also shown in FIG. 3.1, the data warehouse (305) is associated with the advanced machine learning analytics (305f), which is a computing module (e.g., a high-performance computing cluster) for executing analytics, including but not limited to, advanced machine learning analytics. Such analytics may be used to extract additional information from metadata. The additional information extracted by the advanced machine learning analytics (305f) may be stored in the aforementioned tables in the data warehouse (305) and possibly associated to one or more captured network data blocks, e.g., application layer sessions. For example, the advanced machine learning analytics (305f) may be included as part of the data warehouse (305) or the IDP (304).

Also shown in FIG. 3.1, the ICL-like packet processor (306) is a semantic traffic analyzer (STA) that parses packets retrieved from the FPC (303) in order to obtain the corresponding protocol metadata and payload/content. The user interface (330) is deployed by a user to request processing of stored data according to predefined or specifiable (through the user interface (330)) procedures, possibly specifying a subset of the stored data on which the processing is to be performed (for example, by means of a query on the stored data), and displaying at least a portion of the stored data and the output of the processing in a specific manner that may be selected or specified by the analyst user through the user interface (330).

Based on the foregoing discussion regarding the system architecture (300), the ICL (302) and IDP (304) collectively represent an example of the network traffic analysis device (122) described in reference to FIG. 1 above. Similarly, the FPC (303) represents an example of the network traffic access device (123) and the data repository (128), the data warehouse (305) represents an example of the metadata repository (127), and the user interface (330) represents an example of the user system (140), as described in reference to FIG. 1 above. In addition, the network traffic data blocks (135) shown in FIG. 1, based on which the ICL (302) analyzes and indexes the network data, and the FPC (303) captures and stores the network data, may be application layer sessions.

Also shown in FIG. 3.1, the solid curves and dashed curves identified according to the legend (340) represent data flows among various components of FIG. 1 and are described in further details in reference to FIGS. 3.2-3.12 below. In each of the FIGS. 3.2, 3.3, 3.4, 3.5, 3.6, 3.7, 3.8, 3.9, 3.10, 3.11, and 3.12, one or more components of FIG. 3.1 are reproduced to illustrate the data flows while other components of FIG. 3.1 may be omitted for clarity. Stream data flows are fed automatically as new traffic flows through the communication link (301) and is processed by the capture devices (310) and the processing devices (320). In one or more embodiments, the content of the data stream is determined by rules chosen by the analyst user. For example, as previously explained, the classifier (303b) may identify flows whose metadata is moved, as content of the data stream, to the processing devices (320). Stream data flows are characterized by the fact that data, matching rules that may be restricting the stream data flow content, is moved in an opportunistic way, as soon as it becomes available. In contrast, query/resp data flows move data when a query is originated (e.g., by the analyst user) and the corresponding response has been computed in response to the query.

FIG. 3.2 shows the same example system architecture (300) described above and overlaid with additional annotations (321) through (326) to illustrate an analyst user application example. Specifically, the annotation (321) indicates that the analyst user monitors, via the user interface (330), information captured and processed by the capture devices (310) and processing devices (320) to eventually identify activities that deserve further analysis of the application/session headers and/or payloads. The annotation (322) indicates that the analyst user runs sophisticated queries and possibly complex analytics on the high performance computing facility based on the metadata and selected payload information stored in the data warehouse (305) to locate the relevant sessions for which to obtain content from the FPC (303). As shown in FIG. 3.2, the queries relate to relevant HTTP sessions by User 1 with a HTTP User-Agent field containing the 'STD-5/4' string." The annotation (323) indicates that the sessions requested by the analyst user's queries may be identified by the advanced machine learning analytics (305f). The annotation (324) indicates that the requested sessions are correlated to the corresponding packet contents stored in the FPC (303), for example using the method depicted in the flowchart (200) described in reference to FIG. 2 above, which enables packet contents of the requested sessions to be requested from the FPC (303). The annotation (325) indicates that the FPC (303) returns the requested packet contents, in full-packet (i.e., both header and payload) format, header-only format, or payload-only format.

In some usage scenarios, the analyst user may be interested in the application level contents. Retrieval of application level contents generally requires processing multiple packets, reconstruct higher layer connections and sessions (e.g., TCP flows, HTTP sessions) to extract the application (or high layer) payload. The annotation (326) indicates that his task is performed by the ICL-like packet processor (306). The reconstructed payload (or the full packets when requested by the analyst user) is then returned to the analyst user and visualized through the user interface (330).

Additional details of the annotations (321) through (326) are described in reference to FIGS. 3.3 through 3.12 below.

FIG. 3.3 shows the ICL (302) performing packet indexing, which allows the FPC (303) to store the packets in a way that the stored packets may be accessed based on the information in any header field without parsing packets within the FPC (303). Because the FPC (303) is not required to perform packet parsing, the complexity of the FPC (303) is simplified to focus on capturing and storing a very large data flow in real time.

As shown in FIG. 3.3, the ICL (302) captures the packets (331) from the communication link (301) and processes the protocol headers (332a) of the packet A (331a) and the protocol headers (332b) of the packet B (331b). For example, the ICL (302) may process these protocol headers for reconstructing transport layer flows, service flows, and application layer sessions.

In the Internet protocol architecture, where the TCP or UDP protocols are used at the transport layer where a transport layer flow is identified by a 5-tuple composed of the source and destination IP addresses, the transport layer protocol, and the source and destination ports. In other protocol architectures, other transport (and possibly network) protocol fields may be used to uniquely identify transport layer flows.

Service flows are flows of related packets that are correlated due to having some specific purpose. An example of service flow is represented by an exchange of ICMP messages, such as correlated request and responses. DNS queries and correlated responses represent another example of service flow. In general, a protocol that requires the exchange of related messages includes in the message headers information to identify which messages are correlated.

Sessions may include a single flow (e.g., a POP session in which a mail client downloads messages from a mail server) or multiple flows (e.g., an FTP client requesting to download a file from a server on the control connection and receiving the file on the data connection).

Information extracted by the ICL (331) from the protocol headers (331a) and (331b) (e.g., of various layers in the OSI model) is an example of the metadata A (134a) depicted in FIG. 1 above. This extracted information, or metadata, is organized in vectors (e.g., L4 vector (332a), STA (semantic traffic analyzer vector) (333b)). In particular, each vector element either contains the value of a predefined protocol field (i.e., the position of the value in the vectors encodes the meaning and origin of the piece of information) or a tag (providing meaning and origin of the information). The ICL (302) may generate different types of vectors containing different subsets of the information extracted from protocol headers (331a) and (331b). For example, the L4 vector (333a) may contain layer 4 specific information, such as TCP related information, and/or information of the lower layers that is specific to a layer 4 flow, e.g., source and destination IP addresses. In comparison, the STA vector (333b) may contain application related information.

In general, the ICL (302) generates multiple vectors for each session. For example, a different vector may be generated for each relevant event related to a session, referred to as a session event, such as the beginning of the session, a change in the session state, the end of the session, etc. However, all vectors belonging to the same session are labeled with a unique session identifier (or session ID, e.g., session ID (333)) that is automatically generated by the ICL (302). The session ID (333) is an example of the block ID A (131a) depicted in FIG. 1 above.

The ICL (302) reconstructs the application layer payload (i.e., the session payload (334)) of the session and computes a hash of the reconstructed session payload (334), referred to as the payload hash or P hash. Examples of the session payload (334) include the body of an HTTP POST request or the response to an HTTP GET, the body of an e-mail, the voice flow in a VoIP call, the file being transferred as part of an FTP session, etc.

FIG. 3.4 shows a specific example of the ICL (302) performing packet indexing depicted in FIG. 3.3 above. As shown in FIG. 3.4, the packets (331) form a single TCP flow session, while the protocol headers (332a) of the packet A (331a), the protocol headers (332b) of the packet B (331b), etc. are extracted from this single TCP flow session to be stored. In particular, the L4 vector (333a) includes elements extracted from the IP header portion of the protocol headers (332a and 332b) and the TCP header portion of the protocol headers (332a and 332b). In addition, a portion of the STA vector (333b) includes a protocol field value "GET/" and another protocol field value "cookie:" that are extracted from the HTTP header portion of the protocol headers (331a). Similarly, another portion of the STA vector (333b) includes a protocol field value "200 OK" and another protocol field value "Date: d" that are extracted from the protocol headers (331b). The session ID (333) includes the value "1436" that identifies the single TCP flow session containing the packets (331). The session payload (334) is reconstructed by the ICL (302) to include data used by the specific application. Such reconstruction implies interpreting all involved protocols in order to eliminate any redundancy or data mis-ordering that may have been introduced by the operation of some of the protocols. For example, when a session involves TCP, part of the data may be unnecessarily transmitted more than once. This may happen, for example, because the sender assumes a data previously sent was lost, while it was correctly received but the corresponding notification from the receiver to the sender (aka, acknowledgement or ACK) was delayed or lost. In this case, when the ICL (302) reconstructs the session payload (334) from the payload of the single packets, it ensures that data inserted in the payload of multiple packets is used only once in the reconstructed session payload (334).

FIG. 3.5 shows another specific example of the ICL (302) performing packet indexing depicted in FIG. 3.3 above. As shown in FIG. 3.5, the packets (351) form a multiple TCP flow session. In particular, the L4 vector (332a) includes elements extracted from the IP header portion of the protocol headers and the TCP header portion of the protocol headers, different L4 vectors for protocol headers of packets belonging to different respective flows.

FIG. 3.6 shows that a header delimiter (e.g., header delimiter (364)) is associated by the ICL (302) to each packet (e.g., packet A (331a)) in the packets (331) depicted in FIG. 3.1 above. Specifically, the header delimiter marks the position of the first byte in the packet that is used in the reconstruction of the session payload, i.e., the first byte after all of the headers of various protocols corresponding to any of the OSI layers.

FIG. 3.7 shows multiple packets from multiple sessions are stored in FPC (303) and tagged by corresponding keys that identify the sessions. As noted above, the ICL (302) generates a unique key (e.g., K1, K2, K3) for each session (e.g., HTTP session A (371) having 3 packets, POP e-mail downloading session (372) having 4 packets, HTTP session B (373) having two packets); such key is passed from the ICL (302) to the FPC (303) and tagged to all packets belonging to the same session when the packets are stored in the FPC (303), and may be used as an index to access packets in the storage of the FPC (303). The unique key may be generated by the ICL (302) from metadata or may be randomly generated. The session ID assigned by the network protocol may also be used as the key. In the scenario when the session ID is not guaranteed to be unique over a long period of time, the key may be the concatenation of a session ID and a time stamp. If one network traffic data access device (e.g., FPC (303)) is associated with more than one network traffic data analysis device (e.g., ICL (302)), the key are unique within the network traffic data access device (e.g., FPC (303)), hence across multiple network traffic data analysis devices (e.g., ICL (302)). One way to ensure this is to use a unique ICL identifier as part of the key, concatenated to an ICL-wide unique key. The keys K1, K2, and K3 shown in FIG. 3.7 are examples of the block ID A (131*a*) depicted in FIG. 1 above where each of the network traffic data blocks (135) is a session.

In order to associate the right key to all and only the stored packets (i.e., stored in FPC (303)) belonging to the same session, the ICL (302) and associated FPC (303) are synchronized. The synchronization allows the FPC (303) to associate packets to a session and the corresponding key based on information provided by the ICL (302) and with minimum computation. Specifically, the ICL (302) transmits to the FPC (303) the key and criteria of singling out the packets that belong to the session uniquely identified by the key. An example of the criteria of singling out the packets that belong to the session is to use a calculated value (calculated based on the packet content) referred to as an ID hash for identifying each packet in the session. The ID has is an example of the packet ID A (132*a*) depicted in FIG. 1 above. Several ways for generating the ID hash are described below.

One example of the ID hash is the 5-tuple, or a hash value of the 5-tuple, that uniquely identifies the flow(s) that are part of the session. The advantage of this solution is a single ID hash identifies all packets that belong to the same flow. In other words, for each key identifying a session, the ICL (302) transfers to the FPC (303) one ID hash for each of the flows in the session, regardless of the number of packets in the flow. In a common scenario, both ICL (302) and FPC (303) are connected to the same communication link (301) or even the same tapping device on the communication link (301), and therefore observe packets in the same order. In such scenario, the ICL (302) after transmitting to the FPC (303) the key of a session and the ID hash values for all the flows in the session, further transfers the sequence of header delimiters, one per packet. A disadvantage of this approach is that in order to be able to compute a hash value of the 5-tuple, the FPC (303) parses all protocol headers up to layer 4, for all packets to extract the 5-tuples. This may take away resources of the FPC (303) to store the large volume of data corresponding to the full packets.

Another example of the ID hash is a hash of a subset (e.g., the first pre-determined number of bytes) of each packet. This solution has the advantage that the FPC (303) may compute the hash without parsing any protocol header. However, the ID hash value is different for each packet of a session and the ICL (302) communicates to the FPC (303) the ID hash for each of the packets to be associated to a key. This increases the communication overhead between ICL (302) and FPC (303). Moreover, the FPC (303) uses a non trivial algorithm to match the ID hashes. For example, the FPC (303) may keep an ordered list of all ID hashes for each key. Once a packet is captured, the FPC (303) computes the ID hash and compares the computed has value to each of the next expected ID hashes for each of the sessions currently open. The key corresponding to the matched ID hash is associated to the matching packet and the ID hash removed from the ordered list of ID hashes.

Yet another example of the ID hash is to compute for each session one or a few ID hashes that do not change throughout the session and each ID hash uniquely represents the session (i.e., does not match any packet belonging to a different session). For example, the ID hash may be computed using a set of bytes at a fixed location in the packet. One possible way of obtaining this type of ID hash is using the bytes composing the 5-tuple specific to a flow and having the ICL (302) provide the FPC (303) the position in the packet of each byte included in the 5-tuple together with the computed ID hash. This scheme requires the layer 2 and 3 headers to have a fixed length for all or most of the packets belonging to a flow. In the TCP/IP protocol architecture, this requirement is met in most common deployment scenario. Whenever packets have a different size header at layer 2 or layer 3, a different set of positions of the bytes to be used for the computation of the ID hash are provided. The FPC (303) then computes a hash using all provided combinations of bytes and verifies which one of the ID hashes associated with the various keys of the active sessions is matched. In general, any protocol header field that changes within a flow (e.g., the fragment ID in the IP header or the sequence number in the TCP header) is not included in computing this type of ID hash.

FIG. 3.8 shows the synchronization between the ICL (302) and FPC (303). As shown in FIG. 3.8, both ICL (302) and FPC (303) tap the communication link (301) to process the network traffic data (380), which include application layer sessions each having one or more packets. As noted above, the ICL (302) parses packets and reconstructs flows and sessions, while the FPC (303) does not perform such parsing since the actual storage of full packets is by itself quite a challenging task to be performed at wire speed on modern networks. The ICL (302) passes to the FPC (303) information that enables the FPC (303) to (i) associate the key of the corresponding session to each packet and (ii) identify the boundary between header and payload of each packet based on the header delimiter.

For each session processed by the ICL (302), the ICL (302) extracts metadata and uses the key to tag the metadata to generate the tagged metadata (381). The ICL (302) also generates the ID hash for each packet of the processed session and transfers the key/ID hash set (393) to the FPC (303). As shown in FIG. 3.8, for each session, the key/ID hash set (383) includes the key and one or more ID hashes for packets in the session. Accordingly, the FPC (303) uses the key/ID hash set (383) to identify packets captured from the same network traffic data (380) processed concurrently by the ICL (302). All packets identified by the FPC (303) as belonging to the session are tagged by the key and collectively stored in the storage of the FPC (303) as the tagged session (384). The rationale is that checking the hash on the packets has lower complexity than parsing protocol headers and possibly reconstructing sessions. Examples of the tagged session (384) are shown in FIG. 3.7 as (i) the HTTP session A (371) where each packet contained therein is tagged by the key "K1", (ii) the POP e-mail downloading session (372) where each packet contained therein is tagged by the key "K2", and (iii) the HTTP session B (373) where each packet contained therein is tagged by the key "K3". Moreover, for each session the ICL provides the FPC with the Payload Hash (not shown in FIG. 3.8) that is used for de-duplication of content, as discussed later on.

Further as shown in FIG. 3.8, the tagged metadata (381) (e.g., L4 vectors and STA vectors tagged by the key) are processed by the IDP (304) to generate the additional information (referred to as attributes) for adding to the metadata. The tagged metadata (381) thus expanded with the inclusion of attributes are stored in the data warehouse (305) as the tagged metadata/attributes (382). Examples of the attributes include identifiers of the network user generating the session, or the mobile application generating the session. For example, an indication of the mobile application generating the session may be found by properly parsing the User-Agent field of the HTTP header of an HTTP session.

A query to retrieve stored version of the network traffic data (380) from the FPC (303) may be based on any combination of values of protocol fields, which may correspond to certain portion of the tagged metadata (381) and/or the tagged metadata/attributes (382). Accordingly, the tagged metadata (381) and/or the tagged metadata/attributes (382) may be used to select the packets to be retrieved from the FPC (303), as specified by the criteria contained in the query.

FIG. 3.9 shows an example of querying network traffic data stored in the FPC (303). After the key and criteria of singling out the packets that belong to the session uniquely identified by the key are synchronized between the ICL (302) and the FPC (303), the key is used for retrieval of packets from the storage of the FPC (303). When the analyst user submits a query (e.g., query (391)) for network traffic data, various tables in the data warehouse (305) are used to look up a specific key that identifies a session meeting the criteria contained in the query. Accordingly, the FPC (303) may return full packets, just packet headers, or just the payload of all packets belonging to the session identified by this specific key. An index is maintained in the packet storage of the FPC (303) to facilitate packet access by looking up all packets belonging to the queried session using the queried key.

As shown in FIG. 3.9, the criteria contained in the query (391) include particular combination(s) of attribute values, L4 vector values, and/or L7 vector values. In addition, the tagged metadata/attribute (382) described in reference to FIG. 3.8 above now contains four different sessions having keys labeled K1, K2, K3, and K4. For example, the sessions having keys labeled K1, K2, and K3 may be stored in the FPC (303) as those described in reference to FIG. 3.7 above. As noted above, the keys are unique values uniquely identifying each session. As an example, a key may be a string of 10 bytes written in hexadecimal format, such as K1=0xA890E8783E6A66ACBA6A. Within the tagged metadata/attribute (382) depicted in FIG. 3.9, one or more packets of each session are shown as tagged by the corresponding key. One or more session(s) satisfying the criteria contained in the query (391) may be identified, for example by executing advanced machine learning analytics on the tagged metadata/attribute (382) based on the particular combination(s) of attribute values, L4 vector values, and/or L7 vector values contained in the query (391). The corresponding key(s) of the identified session(s) are then provided to the FPC (303) and used to retrieve the corresponding packets from the storage of the FPC (303).

An example of the criteria contained in the query (391) is shown in the annotation (322) of FIG. 3.2 above. Specifically, the example query criteria specifies to find all HTTP sessions generated by User 1 with the User-Agent field containing the string 'STD-5/4'. Such query is executed on the tagged metadata/attribute (382). Once the query execution locates the session vectors (e.g., HTTP vectors) and attributes (e.g., user generating the traffic) that satisfy the query (e.g., User-Agent element of the HTTP vector containing the string 'STD-5/4' and user ID element of the attribute containing the value '1'), the attached keys (e.g., K1 and K3 shown in tagged metadata/attribute (382)) are retrieved for sending to the FPC (303). The FPC (303) uses the key (e.g., K1 and K3) as an index to locate the packets tagged by the key in the storage of the FPC (303), such as the tagged session (384) as described in reference to 3.8 above. Since for each packet stored in the FPC (303) is also linked with the corresponding header delimiter, the FPC (303) may either return, as indicated by the annotation (325) in FIG. 3.2, full packets associated to each requested key (e.g., K1 and K3) or just their headers, or just their payloads.

FIG. 3.10 shows the various functionalities (Element 311 through Element 319) as performed by the FPC (303). Although these functionalities are described in a specific order represented by the arrows, one or more of the functionalities may be omitted or performed in a different order as depicted in FIG. 3.10.

After a packet is captured (Element 311) by the FPC (303) from the communication link (301), the packet is associated, via an ID hash, to the key (Element 317) and the header delimiter received from the ICL (302). The FPC (303) may also perform a filtering functionality (Element 313). Filtering is driven by the ICL (302) that may apply arbitrarily complex filtering policies (i.e., determine which packets shall be retained based on the value of a combination of protocol header fields) and then communicate whether packets matching a given ID hash shall be stored or discarded (Element 318).

De-duplication (Element 314) is applied to avoid storing duplicate copies of the application payload of those sessions having the same application payload. For example, if a video goes viral over the Internet and is downloaded hundreds of thousands of times, many sessions carrying the same video content as the application payload may be identified based on the payload hash (Element 319). De-duplication ensures that the video content is stored in the storage (316) of the FPC (303) only once, although the header of the packets carrying the video content is stored for each single session. The storage (316) is an example of the data repository (128) depicted in FIG. 1 above. Finally, header and payload of packets are compressed before being stored (Element 315).

FIG. 3.11 shows an expanded view of FIG. 3.10 with additional elements overlaying various elements of FIG. 3.10 described above. As shown in FIG. 3.11, once packets are captured (Element 311) by the FPC (303) from the communication link (301), their ID hash is computed (Element 312a) and packets are temporarily stored in a temporary storage (316a) with the associated ID hash until the key corresponding to their ID hash is communicated by the ICL (302). There may be a time lag between packet capture (Element 311) and reception of key and ID hash(es) (Element 302a) from the ICL (302) because the ICL (302) needs to parse headers and reassemble transport layer flows and application layer sessions before being able to generate a key and payload hash.

Once key, ID hash(es) and payload hash (P hash) are received from the ICL (302), the FPC (303) retrieves (Element 303a) corresponding packets from the temporary storage (316a), associates (Element 312) each retrieved packet to the appropriate key and, if not filtered out (Element 313) according to directives (Element 318a) from the ICL (302), store the packets retrieved from the temporary storage (316a) in the FPC storage (316) after having compressed header and payload that have been separated using the header delimiter received from the ICL (302). An example of a stored packet is shown within the stored sessions (384a) having a compressed header and a compressed payload of the packet that is tagged by the corresponding key and payload hash.

The de-duplication function of the FPC (303) is intended to detect duplicated content and avoid storing content more than once in order to reduce requirements for the storage (316). Even though storage is performed at the packet level, de-duplication is performed at the application layer. Specifically, the FPC (303) checks if there are multiple sessions carrying the same application content. If it is found that two sessions contain the same application content, for one of the sessions only packet headers are stored and a reference to the other session, for which both header and payload is stored is provided.

Note that this implies that for sessions whose payload has been de-duplicated, it full packets will not be stored. However, by having access to a stored copy of all of the headers of the packets, an analyst user may reconstruct all protocol operations, hence possibly troubleshoot network problems, or configuration issues, or observe the effect and/or symptoms of security attacks.

FIG. 3.12 shows an example diagram of the FPC de-duplication functionality described in reference to FIG. 3.10 above. The example diagram shows an expanded view of the stored sessions (384a) and an additional element of de-duplicated stored sessions (384b) overlaying the de-duplication (314) and storage (316) of FIG. 3.10 described above. As shown in FIG. 3.12, the expanded view of the stored sessions (384a) includes (i) stored packet 1 (384a1) having a compressed header and a compressed payload of the packet 1 that is tagged by the corresponding key K1 and payload hash PH1, (ii) stored packet 2 (384a2) having a compressed header and a compressed payload of the packet 2 that is tagged by the corresponding key K1, (iii) stored packet 3 (384a3) having a compressed header and a compressed payload of the packet 3 that is tagged by the corresponding key K2 and payload hash PH2, (i) stored packet 4 (384a4) having a compressed header and a compressed payload of the packet 4 that is tagged by the corresponding key K3 and payload hash PH2. While the payload hashes (e.g., PH1 and PH2) are generated from the corresponding full session payloads, a payload hash is used to tag each stored packets of a corresponding session in the stored sessions (384a). the keys K1, K2, and K3, as well as the payload hash PH1 and PH2 were received from the ICL (302) and used by the FPC (303) to tag the stored packet 1 (384a1) through stored packet 4 (384a4). For example, the key/ID hash set (383) depicted in FIG. 3.8 above may be expanded to include the payload hash of the session uniquely identified by the key. Based on the keys tagged to the stored packets, the stored packet 1 (384a1) and stored packet 2 (384a2) belong to the same session identified by the key K1, while the stored packet 3 (384a3) and stored packet 4 (384a4) each belong to other different sessions identified by the keys K2 and K3, respectively.

As shown in FIG. 3.12, the payload de-duplication is based on the comparison of payload hashes among stored packets in the stored sessions (384a). De-duplication is based on searching the PFC storage (316) for sessions that have the same Payload hash. For example, FPC (303) determines, without processing packets to extract the application payload, that the session identified by the key K2 and the other session identified by the key K3 contain duplicated application payloads based on the payload hash PH2. According, the stored sessions (384a) is revised by the de-duplication operation to become the de-duplicated stored sessions (384b). While the stored packet 1 (384a1), stored packet 2 (384a2), and stored packet 3 (384a3) remained unchanged in the de-duplicated stored sessions (384b), the compressed payload initially contained in the stored packet 4 (384a4) is now removed and the stored packet 4 (384a4) is replaced by the de-duplicated stored packet 4 (384b4) in the de-duplicated stored sessions (384b). In particular, the de-duplicated stored packet 4 (384b4) contains no application payload but includes a link (384c) to reference the compressed payload contained in the stored packet 3 (384a3) in the de-duplicated stored sessions (384b).

Figure 4:
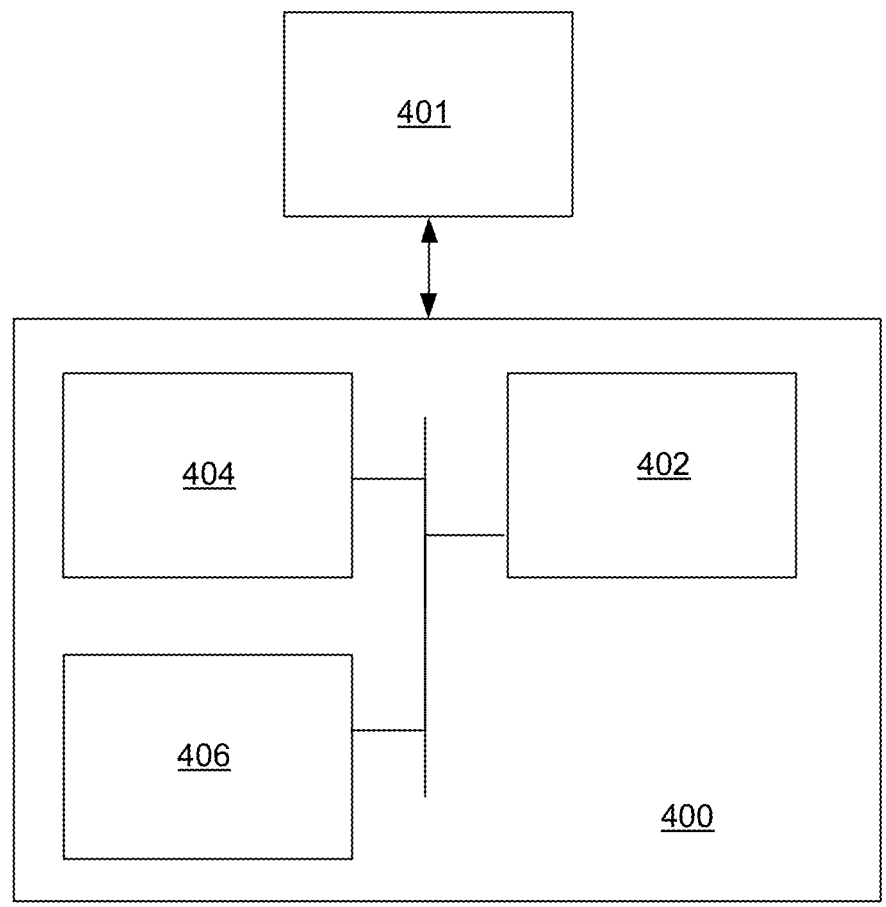
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing network traffic data of a network, comprising:

analyzing, by a computer processor of a network traffic data analysis device, a network traffic data block to generate metadata of the network traffic data block, wherein the network traffic data block comprises a plurality of packets of the network traffic data, wherein the metadata represents at least a portion of the plurality of packets, wherein the network traffic data block is assigned a unique data block identifier;

further analyzing, by the computer processor of the network traffic data analysis device and based on a predetermined algorithm, the network traffic data block to generate at least one packet identifier, wherein the at least one packet identifier identifies from the network traffic data each of the plurality of packets in the network traffic data block;

storing, by a network traffic data access device and concurrently with the network traffic data analysis device generating the metadata and the at least one packet identifier, the network traffic data in a data repository;

receiving, from the network traffic data analysis device by the network traffic data access device, the unique data block identifier in association with the at least one packet identifier; and indexing, by the network traffic data access device and in response to receiving the unique data block identifier and the at least one packet identifier, the network traffic data in the data repository, comprising:

analyzing, by the network traffic data access device and based on the pre-determined algorithm, an untagged portion of the network traffic data stored in the data repository to determine a first match with the at least one packet identifier;

selecting, by the network traffic data access device and based on the first match, the plurality of packets from the network traffic data stored in the data repository; and tagging each of the selected plurality of packets using the unique data block identifier and removing the tagged plurality of packets from the untagged portion of the network traffic data, wherein the plurality of packets are retrieved based on the unique data block identifier from the data repository in response to a user query based on the metadata.

2. The method of claim 1,
wherein the metadata comprises an extracted portion of the network traffic data block and an attribute inferred from the network traffic data block.

3. The method of claim 1,
wherein the at least one packet identifier comprises a first packet identifier identifying a first portion of the plurality of packets and a second packet identifier identifying a second portion of the plurality of packets.

4. The method of claim 1,
wherein the at least one packet identifier comprise a single packet identifier identifying all of the plurality of packets.

5. The method of claim 1,
wherein the unique data block identifier is generated based on at least one selected from a group consisting of the metadata of the network traffic data block and a random sequence number generation algorithm, and
wherein the at least one packet identifier comprises a hash value of a portion of the at least one packet.

6. The method of claim 1, wherein indexing the network traffic data in the data repository further comprises:
further analyzing, by the network traffic data access device and based on the pre-determined algorithm, the network traffic data block to generate a network traffic data access device version of the at least one packet identifier, and
wherein determining the first match is based on a comparison between the at least one packet identifier and the network traffic data access device version of the at least one packet identifier.

7. The method of claim 1, further comprising:
further analyzing, by the network traffic data analysis device, the network traffic data block to generate at least one packet header delimiter, wherein the at least one packet header delimiter identifies a boundary between a header and a payload of at least one packet of the plurality of packets in the network traffic data block;

receiving, from the network traffic data analysis device by the network traffic data access device, the at least one packet header delimiter in association with the at least one packet identifier; and compressing, by the network traffic data access device, the header and the payload of the at least one packet separately based on the at least one packet header delimiter.

8. The method of claim 1, further comprising:
further analyzing, by the network traffic data analysis device, the network traffic data block to generate at least one packet payload attribute, wherein the at least one packet payload attribute represents characteristics of a payload of at least one packet of the plurality of packets in the network traffic data block;

determining, by the network traffic data analysis device, a store/discard status of the at least one packet based on the at least one packet payload attribute and a pre-determined filtering policy;

receiving, from the network traffic data analysis device by the network traffic data access device, the at least one packet in association with the at least one packet identifier and the store/discard status; and filtering, by the network traffic data access device, the at least one packet based on the at least one packet identifier and the store/discard status.

9. The method of claim 1, further comprising:
storing, by the network traffic data analysis device, the metadata referenced by the unique data block identifier in a metadata repository;

comparing, by the network traffic data analysis device, the user query with contents of the metadata repository to determine a second match with the metadata;

retrieving, by the network traffic data analysis device from the metadata repository and based on the second match, the unique data block identifier of the network traffic data block for sending to the network traffic data access device;

retrieving, by the network traffic data access device from the data repository and in response to receiving the unique data block identifier of the network traffic data block, the plurality of packets of the network traffic data block based on the unique data block identifier tagged to the plurality of packets that are stored in the data repository; and providing, by the network traffic data access device, the retrieved plurality of packets to a user as a result of the user query.

10. A system for accessing network traffic data of a network, comprising:
a network traffic data analysis device configured to:
analyze a network traffic data block to generate metadata of the network traffic data block, wherein the network traffic data block comprises a plurality of packets of the network traffic data, wherein the metadata represents at least a portion of the plurality of packets, wherein the network traffic data block is assigned a unique data block identifier;

further analyze, based on a pre-determined algorithm, the network traffic data block to generate at least one packet identifier, wherein the at least one packet identifier identifies from the network traffic data each of the plurality of packets in the network traffic data block; and send, to the network traffic data analysis device, the unique data block identifier in association with the at least one packet identifier;

a network traffic data access device configured to:

store, concurrently with the network traffic data analysis device generating the metadata and the at least one packet identifier, the network traffic data in a data repository;

receive, from the network traffic data analysis device, the unique data block identifier in association with the at least one packet identifier; and index, in response to receiving the unique data block identifier and the at least one packet identifier, the network traffic data in the data repository, comprising:

analyzing, based on the pre-determined algorithm, an untagged portion of the network traffic data stored in the data repository to determine a first match with the at least one packet identifier;

selecting, based on the first match, the plurality of packets from the network traffic data stored in the data repository; and tagging each of the selected plurality of packets using the unique data block identifier and removing the tagged plurality of packets from the untagged portion of the network traffic data; and a data repository for storing the network traffic data, wherein the plurality of packets are retrieved based on the unique data block identifier from the data repository in response to a user query based on the metadata.

11. The system of claim 10,
wherein the metadata comprises an extracted portion of the network traffic data block and an attribute inferred from the network traffic data block.

12. The system of claim 10,
wherein the at least one packet identifier comprises a first packet identifier identifying a first portion of the plurality of packets and a second packet identifier identifying a second portion of the plurality of packets.

13. The system of claim 10,
wherein the at least one packet identifier comprise a single packet identifier identifying all of the plurality of packets.

14. The system of claim 10,
wherein the unique data block identifier is generated based on at least one selected from a group consisting of the metadata of the network traffic data block and a random sequence number generation algorithm, and
wherein the at least one packet identifier comprises a hash value of a portion of the at least one packet.

15. The system of claim 10, wherein indexing the network traffic data in the data repository further comprises:
further analyzing, by the network traffic data access device and based on the pre-determined algorithm, the network traffic data block to generate a network traffic data access device version of the at least one packet identifier, and
wherein determining the first match is based on a comparison between the at least one packet identifier and the network traffic data access device version of the at least one packet identifier.

16. The system of claim 10,
wherein the network traffic data analysis device is further configured to:
further analyze the network traffic data block to generate at least one packet header delimiter, wherein the at least one packet header delimiter identifies a boundary between a header and a payload of at least one packet of the plurality of packets in the network traffic data block, and wherein the network traffic data access device is further configured to:
receive, from the network traffic data analysis device, the at least one packet header delimiter in association with the at least one packet identifier; and
compress the header and the payload of the at least one packet separately based on the at least one packet header delimiter.

17. The system of claim 10,
wherein the network traffic data analysis device is further configured to:
further analyze the network traffic data block to generate at least one packet payload attribute, wherein the at least one packet payload attribute represents characteristics of a payload of at least one packet of the plurality of packets in the network traffic data block; and
determine a store/discard status of the at least one packet based on the at least one packet payload attribute and a pre-determined filtering policy, and
wherein the network traffic data access device is further configured to:
receive, from the network traffic data analysis device, the at least one packet in association with the at least one packet identifier and the store/discard status; and
filter the at least one packet based on the at least one packet identifier and the store/discard status.

18. The system of claim 10, further comprising:
wherein the network traffic data analysis device is further configured to:
store the metadata referenced by the unique data block identifier in a metadata repository;
compare the user query with contents of the metadata repository to determine a second match with the metadata; and
retrieve, from the metadata repository and based on the second match, the unique data block identifier of the network traffic data block for sending to the network traffic data access device, and
wherein the network traffic data access device is further configured to:
retrieve, from the data repository and in response to receiving the unique data block identifier of the network traffic data block, the plurality of packets of the network traffic data block based on the unique data block identifier tagged to the plurality of packets that are stored in the data repository; and
provide the retrieved plurality of packets to a user as a result of the user query.

19. A non-transitory computer readable medium embodying instructions for accessing network traffic data of a network, the instructions when executed by a processor comprising functionality for:

analyzing, by a network traffic data analysis device, a network traffic data block to generate metadata of the network traffic data block, wherein the network traffic data block comprises a plurality of packets of the network traffic data, wherein the metadata represents at least a portion of the plurality of packets, wherein the network traffic data block is assigned a unique data block identifier;

further analyzing, the network traffic data analysis device and based on a pre-determined algorithm, the network traffic data block to generate at least one packet identifier, wherein the at least one packet identifier identifies from the network traffic data each of the plurality of packets in the network traffic data block;

storing, by a network traffic data access device and concurrently with the network traffic data analysis device generating the metadata and the at least one packet identifier, the network traffic data in a data repository;

receiving, from the network traffic data analysis device by the network traffic data access device, the unique data block identifier in association with the at least one packet identifier; and indexing, by the network traffic data access device and in response to receiving the unique data block identifier and the at least one packet identifier, the network traffic data in the data repository, comprising:

analyzing, by the network traffic data access device and based on the pre-determined algorithm, an untagged portion of the network traffic data stored in the data repository to determine a first match with the at least one packet identifier;

selecting, by the network traffic data access device and based on the first match, the plurality of packets from the network traffic data stored in the data repository; and tagging each of the selected plurality of packets using the unique data block identifier and removing the tagged plurality of packets from the untagged portion of the network traffic data, wherein the plurality of packets are retrieved, based on the unique data block identifier from the data repository in response to a user query based on the metadata.

20. The non-transitory computer readable medium of claim 19, wherein the metadata comprises an extracted portion of the network traffic data block and an attribute inferred from the network traffic data block, wherein the unique data block identifier is generated based on at least one selected from a group consisting of the metadata of the network traffic data block and a random sequence number generation algorithm, wherein the at least one packet identifier comprises a hash value of a portion of the at least one packet, and wherein indexing the network traffic data in the data repository further comprises:

further analyzing, by the network traffic data access device and based on the pre-determined algorithm, the network traffic data block to generate a network traffic data access device version of the at least one packet identifier, and wherein determining the first match is based on a comparison between the at least one packet identifier and the network traffic data access version of the at least one packet identifier.

* * * * *